US012151852B2

(12) United States Patent
Woo et al.

(10) Patent No.: US 12,151,852 B2
(45) Date of Patent: Nov. 26, 2024

(54) PAPER CUP OF DUAL STRUCTURE AND METHOD FOR MANUFACTURING SAME

(71) Applicants: Bong Yoon Woo, Seoul (KR); Ji Youn Woo, Seoul (KR)

(72) Inventors: Bong Yoon Woo, Seoul (KR); Ji Youn Woo, Seoul (KR)

( * ) Notice: Subject to any disclaimer, the term of this patent is extended or adjusted under 35 U.S.C. 154(b) by 779 days.

(21) Appl. No.: 17/273,336

(22) PCT Filed: Sep. 6, 2019

(86) PCT No.: PCT/KR2019/011547
§ 371 (c)(1),
(2) Date: Mar. 4, 2021

(87) PCT Pub. No.: WO2020/050681
PCT Pub. Date: Mar. 12, 2020

(65) Prior Publication Data

US 2021/0323715 A1 Oct. 21, 2021

(30) Foreign Application Priority Data

Sep. 7, 2018 (KR) ........................ 10-2018-0107203
Sep. 3, 2019 (KR) ........................ 10-2019-0108946

(51) Int. Cl.
*B65D 3/22* (2006.01)
*A47G 19/22* (2006.01)
(Continued)

(52) U.S. Cl.
CPC ........... *B65D 3/22* (2013.01); *A47G 19/2205* (2013.01); *B31C 7/02* (2013.01); *B65D 3/14* (2013.01);
(Continued)

(58) Field of Classification Search
CPC ... B65D 3/04; B65D 3/06; B65D 3/22; B65D 3/28; B65D 3/30; B65D 81/3818;
(Continued)

(56) References Cited

U.S. PATENT DOCUMENTS 5,145,107 A * 9/1992 Silver ...................... B65D 3/22 229/4.5
5,524,817 A * 6/1996 Meier ...................... B65D 3/22 229/4.5
(Continued)

FOREIGN PATENT DOCUMENTS

CN 102333703 A * 1/2012 ............... B31B 1/25
JP H106-008213 U 2/1994
(Continued)

OTHER PUBLICATIONS

Machine Translation of JP 06-008213 (Year: 1994).*
Int'l Search Report for PCT/KR2019/011547, mailed Dec. 13, 2019 (6 pages).

*Primary Examiner* — Nathan J Newhouse
*Assistant Examiner* — Phillip D Schmidt
(74) *Attorney, Agent, or Firm* — Leason Ellis LLP

(57) ABSTRACT

A paper cup of a dual structure according to one embodiment of the present invention comprises: an inner paper part having a plurality of diameter adjusting portions formed at predetermined angle intervals on one surface; a drink receiving part formed extending from one end of the inner paper part and bending formed into the inner portion of the inner paper part; and a drinking part formed at a boundary between the inner paper part and the drink receiving part and curled in a radially outward direction of the drink receiving part.

15 Claims, 24 Drawing Sheets

(51) Int. Cl.

| | |
|---|---|
| ***B31C 7/02*** | (2006.01) |
| ***B65D 3/14*** | (2006.01) |
| ***B65D 43/02*** | (2006.01) |
| ***B65D 81/38*** | (2006.01) |
| *B65D 3/06* | (2006.01) |

(52) U.S. Cl.
CPC ..... *B65D 43/0208* (2013.01); *B65D 81/3869* (2013.01); *B65D 3/06* (2013.01); *B65D 81/3818* (2013.01); *B65D 2543/00046* (2013.01); *B65D 2543/00092* (2013.01); *B65D 2543/00222* (2013.01); *B65D 2543/00518* (2013.01); *B65D 2543/00537* (2013.01); *B65D 2543/00555* (2013.01); *B65D 2543/00638* (2013.01); *B65D 2543/00685* (2013.01); *B65D 2543/00759* (2013.01); *B65D 2543/00796* (2013.01)

(58) Field of Classification Search
CPC ...... B65D 81/3869; B65D 2543/00046; B65D 2543/00222; B31C 7/00; B31C 7/06; B31C 7/08; B31C 9/00; B31C 11/00; B31C 11/02; B31C 7/02; B31C 7/04
USPC .... 229/400, 403, 404, 103.11, 4.5; 493/296, 493/295, 299, 308
See application file for complete search history.

(56) References Cited

U.S. PATENT DOCUMENTS

| | | | | | |
|---|---|---|---|---|---|
| 5,752,653 | A * | 5/1998 | Razzaghi | A47G 23/0216 229/4.5 | |
| 9,327,895 | B2 * | 5/2016 | Robertson | B65D 21/0233 | |
| 2004/0084346 | A1 * | 5/2004 | Candy | B65D 21/0213 206/505 | |
| 2005/0087539 | A1 * | 4/2005 | Waller | A47G 19/2272 220/781 | |
| 2005/0178677 | A1 * | 8/2005 | Morrow | B65D 51/28 206/219 | |
| 2005/0184074 | A1 * | 8/2005 | Simmons | B65D 81/3869 220/592.17 | |
| 2007/0262129 | A1 * | 11/2007 | Zadravetz | B65D 3/04 229/939 | |
| 2008/0164270 | A1 * | 7/2008 | Puerini | B65D 81/3865 220/737 | |
| 2009/0008438 | A1 * | 1/2009 | Dagdagan | B65D 81/3876 220/739 | |
| 2010/0072268 | A1 * | 3/2010 | Johnson | B65D 81/3869 229/403 | |
| 2017/0112306 | A1 | 4/2017 | Muir | | |
| 2017/0361587 | A1 * | 12/2017 | Ding | B32B 7/14 | |

FOREIGN PATENT DOCUMENTS

| | | | | | |
|---|---|---|---|---|---|
| JP | 2007-516734 | A | | 6/2007 | |
| JP | 2014125260 | A | * | 7/2014 | |
| JP | 5878437 | B2 | * | 3/2016 | |
| KR | 20-1992-0017610 | U | | 10/1992 | |
| KR | 200417950 | Y1 | * | 6/2006 | |
| KR | 2017057698 | A | * | 5/2017 | A47G 19/2205 |
| KR | 20210074665 | A | * | 6/2021 | |

* cited by examiner

PAPER CUP OF DUAL STRUCTURE AND METHOD FOR MANUFACTURING SAME

TECHNICAL FIELD

The present invention relates to a paper cup having a dual structure and a method for manufacturing the same.

BACKGROUND ART

In general, paper cups are used in various ways in daily life. Particularly, the use of plastic has become an international issue recently, and in order to reduce the use of disposable plastic products, regulations about the use of disposable plastic are being implemented. Therefore, the demand for cups made of paper is increasing.

Paper cups, which are most commonly used, have advantages, such as a simple structure and mass-producibility, but when a paper cup is used to hold a cold beverage in the summer, the temperature of the beverage may rapidly increase, or when a paper cup is used to hold a hot beverage in the winter, the temperature of the beverage may rapidly decrease, and thus, the paper cups have a poor insulation function.

RELATED ART DOCUMENT (Patent Document 1) JP5878437 B2

DISCLOSURE

Technical Problem

Therefore, the present invention has been made in view of the above problems, and it is an object of the present invention to provide a paper cup having a dual structure which includes an inner paper part having a plurality of diameter adjusting portions, and a drink receiving part formed to extend from the inner paper part and to be bent in a direction towards the inner portion of the inner paper part, and forms an adiabatic space between the inner paper part and a drink receiving part.

It is another object of the present invention to provide a paper cup having a dual structure which includes a grip part configured to cover the outer circumferential surface of an inner paper part.

It is still another object of the present invention to provide a method for manufacturing a paper cup having a dual structure which forms an adiabatic space between an inner paper part and a drink receiving part through a sequential process for manufacturing the paper cup.

It is yet another object of the present invention to provide a method for manufacturing a paper cup having a dual structure which forms an adiabatic space between an outer cup and an inner cup through a sequential process for manufacturing the paper cup.

It is still yet another object of the present invention to provide a paper cup having a dual structure in which one guide member or a plurality of guide members is disposed alternately in the vertical direction in the space of a drinking path configured to connect a drink receiving part and a through hole for the purpose of drinking from the outside so as to effectively prevent a drink from overflowing through the through hole or being discharged to the through hole due to the sudden flow of the drink, and induces a flow path to be formed in a curved shape rather than a straight linear shape when drinking so as to appropriately control the flow speed or the flow rate of the drink when drinking.

Technical Solution

Therefore, the present invention has been made in view of the above problems, and it is an object of the present invention to provide a paper cup having a dual structure, including an inner paper part having a plurality of diameter adjusting portions formed at predetermined angular intervals on one surface thereof, a drink receiving part formed to extend from one end of the inner paper part and to be bent towards an inner portion of the inner paper part, and a drinking part formed at a boundary between the inner paper part and the drink receiving part and rolled in a radially outward direction of the drink receiving part.

The paper cup may further include a grip part configured to cover an outer surface of the inner paper part, a first bottom part formed at one end of the drink receiving part and adhesively coupled to the end of the drink receiving part so as to alternate with the end of the drink receiving part, and a second bottom part formed at one end of the inner paper part and adhesively coupled to the end of the inner paper part so as to alternate with the end of the inner paper part, and a space between the inner paper part and the drink receiving part may be sealed by the first bottom part and the second bottom part so as to form an adiabatic space.

The adiabatic space may be formed to have a regular thickness between the inner paper part and the drink receiving part.

The paper cup may further include a lid part including a first protrusion fitted on the drinking part, a second protrusion connected to the first protrusion through a recess so as to be formed consecutively with the first protrusion and configured to have a through hole formed through an upper surface thereof, and an adiabatic part having a regular thickness and formed on a lower surface of the lid part so as to form a lid adiabatic space.

The diameter adjusting portions may be formed to protrude from a lower end of the inner paper part in a radially outward direction thereof, and the grip part may be coupled to protruding regions of the diameter adjusting portions so as to cover the outer surface of the inner paper part.

It is a further object of the present invention to provide a method for manufacturing a paper cup having a dual structure, the method including rolling one paper member configured such that an inner paper part and a drink receiving part are connected, into a truncated conical shape, folding the drink receiving part towards an inner portion of the inner paper part along a boundary at which the inner paper part and the drink receiving part come into linear contact with each other, adjusting a diameter of the inner paper part by forming a plurality of diameter adjusting portions at predetermined angular intervals on one surface of the inner paper part so as to protrude in a radially outward direction of a lower end of the inner paper part, forming a drinking part by rolling a region between the inner paper part and the drink receiving part in a radially outward direction of the drink receiving part, forming a first bottom part at one end of the drink receiving part to be adhesively coupled to the end of the drink receiving part so as to alternate with the end of the drink receiving part, and forming a second bottom part at one end of the inner paper part to be adhesively coupled to the end of the inner paper part so as to alternate with the end of the inner paper part.

The method may further include adhesively coupling a grip part to the inner paper part so as to cover an outer surface of the inner paper part.

In the forming the first bottom part and in the forming the second bottom part, a space between the inner paper part and the drink receiving part may be sealed by the first bottom part and the second bottom part so as to form an adiabatic space.

The adiabatic space may be formed to have a uniform thickness.

The method may further include coupling a lid part, including a first protrusion fitted on the drinking part, a second protrusion connected to the first protrusion through a recess so as to be formed consecutively with the first protrusion and configured to have a through hole formed through an upper surface thereof, and an adiabatic part having a regular thickness and formed on a lower surface of the lid part so as to form a lid adiabatic space, to the drinking part.

In the adhesively coupling the grip part to the inner paper part, the grip part may be coupled to protruding regions of the diameter adjusting portions, formed to protrude in a radially outward direction of the inner paper part, so as to cover the outer surface of the inner paper part.

It is another object of the present invention to provide a method for manufacturing a paper cup having a dual structure, the method including adjusting a diameter of an outer cup configured to constitute an inner paper part by forming a plurality of diameter adjusting portions at predetermined angular intervals on one surface of the outer cup so as to protrude in a radially outward direction of a lower end of the outer cup, inserting an inner cup into the outer cup, and forming a drinking part by rolling outer circumferences of the outer cup and the inner cup in the radially outward direction.

The method may further include adhesively coupling a grip part to the outer cup so as to cover an outer surface of the outer cup.

In the forming the drinking part, a space between the outer cup and the inner cup may be sealed so as to form an adiabatic space.

The adiabatic space may be formed to have a uniform thickness.

The method may further include coupling a lid part, including a first protrusion fitted on the drinking part, a second protrusion connected to the first protrusion through a recess so as to be formed consecutively with the first protrusion and configured to have a through hole formed through an upper surface thereof, and an adiabatic part having a regular thickness and formed on a lower surface of the lid part so as to form a lid adiabatic space, to the drinking part.

It is yet another object of the present invention to provide a paper cup having a dual structure, including an inner paper part having a plurality of diameter adjusting portions formed at predetermined angular intervals on one surface thereof, a drink receiving part formed to extend from one end of the inner paper part so as to contain a drink within the inner paper part, a drinking part formed at a boundary between the inner paper part and the drink receiving part, a first protrusion fitted on the drinking part, a second protrusion connected to the first protrusion through a recess to be formed consecutively with the first protrusion and configured to have a through hole formed through an upper surface thereof and an inner receiving part formed therein, and a lower lid part including an outer circumferential wall coupled to an inner surface of an inner circumference of the second protrusion, an adiabatic member configured to extend from the outer circumferential wall and separated from an inner upper surface of the second protrusion so as to form an adiabatic space, and a drinking path part configured to enable the drink receiving part and the through hole to communicate with each other.

The drinking path part may be formed to be sealed in the adiabatic space, and may include at least one guide member formed in a direction perpendicular to a space of a drinking path configured to connect the drink receiving part and the through hole, and coupled to the drinking path so as to enable a drink in the drink receiving part to flow therein.

The drinking path part may be configured such that one side wall and a remaining side wall disposed opposite the one side wall are coupled to be mutually sealed to form the space of the drinking path, and the at least one guide member may include a first guide member configured to extend the one side wall in a direction towards the remaining side wall so as to be separated from the remaining side wall and a second guide member configured to extend the remaining side wall in a direction towards the one side wall so as to be separated from the one side wall, the first guide member and the second guide member being formed so as to alternate with each other in a length direction of the space of the drinking path.

One end of the first guide member in the direction towards the remaining side wall and one end of the second guide member in the direction towards the one side wall may be located so as to overlap each other in the length direction of the space of the drinking path.

The one end of the first guide member in the direction towards the remaining side wall and the one end of the second guide member in the direction towards the one side wall may be located at positions coinciding with each other in the length direction of the space of the drinking path.

Advantages and features of the present invention will become apparent from the descriptions of aspects herein below with reference to the accompanying drawings.

Terms or words which will be used in the following description and the accompanying drawings are not interpreted as having general meanings or dictionary meanings, and these terms or words should be interpreted as having meanings and concepts coinciding with the technical idea of the present invention based on the principle that the inventor (s) may appropriately define the concepts of terms in order to describe the present invention in the best mode for carrying out the present invention.

Advantageous Effects

According to one embodiment of the present invention, due to the formation of diameter adjusting portions, the outer circumferential diameter of an inner paper part of a paper cup having a dual structure is decreased as it moves towards the lower portion of the paper cup, thereby making it easy for a user to hold (grip) the paper cup.

Further, the paper cup having the dual structure has an adiabatic space between the inner paper part and a drink receiving part, thereby enabling the user to grip the paper cup without burning in his/her hand.

Further, the adiabatic space minimizes dissipation of heat from a drink in the drink receiving part to the outside, thereby being capable of maximally maintaining the temperature of the drink.

Further, the adiabatic space ensures a sufficient thickness due to the diameter adjusting portions, thereby being capable of maximizing the adiabatic effect.

Further, a lid part having a lid adiabatic space formed by an adiabatic part is fitted on a drinking part, thereby being capable of maximizing the adiabatic effect on the drink.

Further, a grip part is coupled to protruding regions of the diameter adjusting portions, which protrude in the radially outward direction of the inner paper part, so as to cover the outer surface of the inner paper part, thereby forming a separation space between the inner paper part and the grip part and thus being capable of maximizing the adiabatic effect on the drink.

In addition, in a method for manufacturing the paper cup according to one embodiment of the present invention, because a single paper member, in which the inner paper part and the drink receiving part are integrally formed, is used, the cumbersomeness of preparing two kinds of members may be avoided, a process for manufacturing the paper cup having the dual structure may be simplified, and the paper cup may have excellent sealability, which is advantageous in the formation of the adiabatic space.

Further, in a method for manufacturing a paper cup having a dual structure according to another embodiment of the present invention, a drinking part is formed by rolling the outer circumferences of both an outer cup and an inner cup in the radially outward direction, and thereby, the paper cup may be conveniently manufactured.

Moreover, one guide member or a plurality of guide members is disposed alternately in a direction perpendicular to the length direction of the space of a drinking path configured to connect a through hole of the lid part and the drink receiving part inside the cup, thereby being capable of effectively preventing a drink in the drink receiving part from being suddenly discharged to the through hole or overflowing through the through hole due to pressure or external impact, and enabling the drink to naturally flow through an open space between each of the guide members and one end of the drinking path so as to effectively control the flow speed and the flow rate of the drink.

BEST MODE

Figure 1:
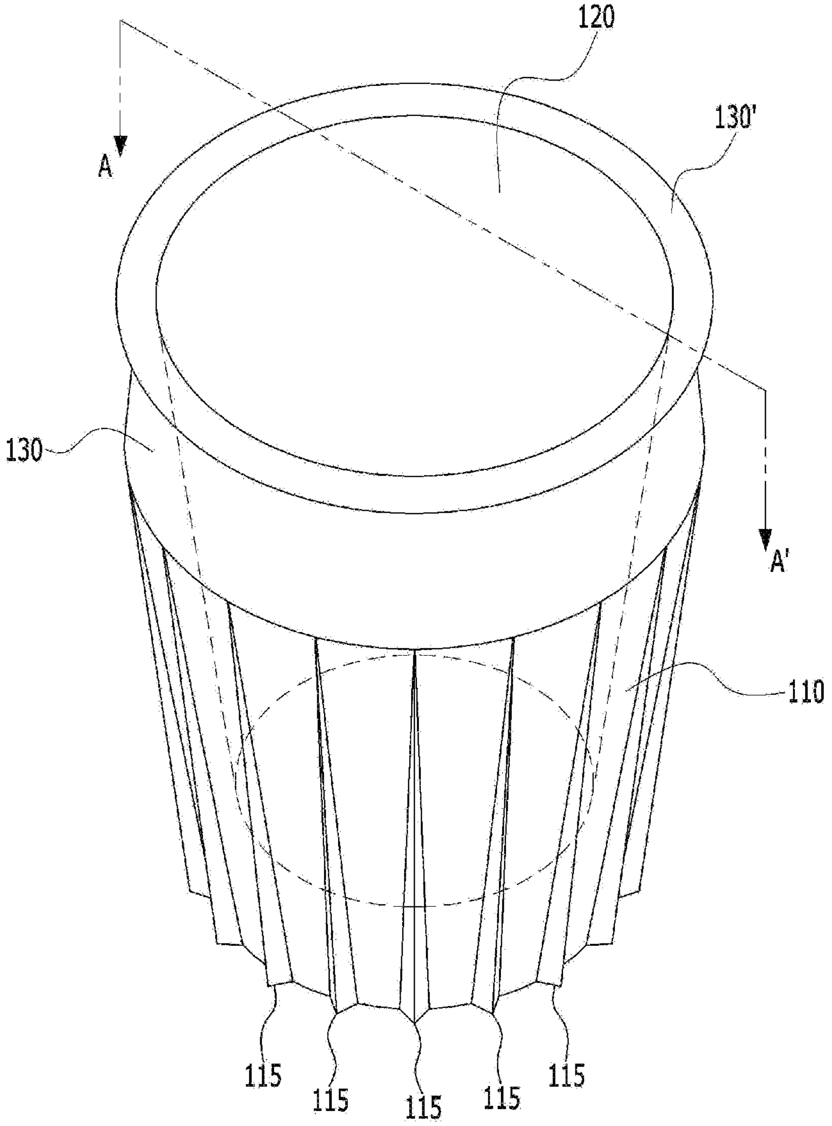
FIG. 1 is an assembled perspective view of a paper cup having a dual structure according to one embodiment of the present invention.

The above and other objects, advantages and features of the present invention will become apparent from the descriptions of aspects herein below with reference to the accompanying drawings. In the drawings and the following description of the present invention, the same or similar elements are denoted by the same reference numerals, even when they are depicted in different drawings. Further, terms, such as "one", "the other", "first", "second", etc., are used only to distinguish one element, component, region, layer or section from another element, component, region, layer, or section, and these elements, components, regions, layers and/or sections should not be construed to be limited by these terms. In the following description of the present invention, a detailed description of known functions and configurations incorporated herein will be omitted when it may make the subject matter of the present invention rather unclear.

Hereinafter, reference will now be made in detail to exemplary embodiments of the present invention, examples of which are illustrated in the accompanying drawings, and like reference numerals and designation in the drawings and the following description of the present invention indicate like elements.

Figure 2:
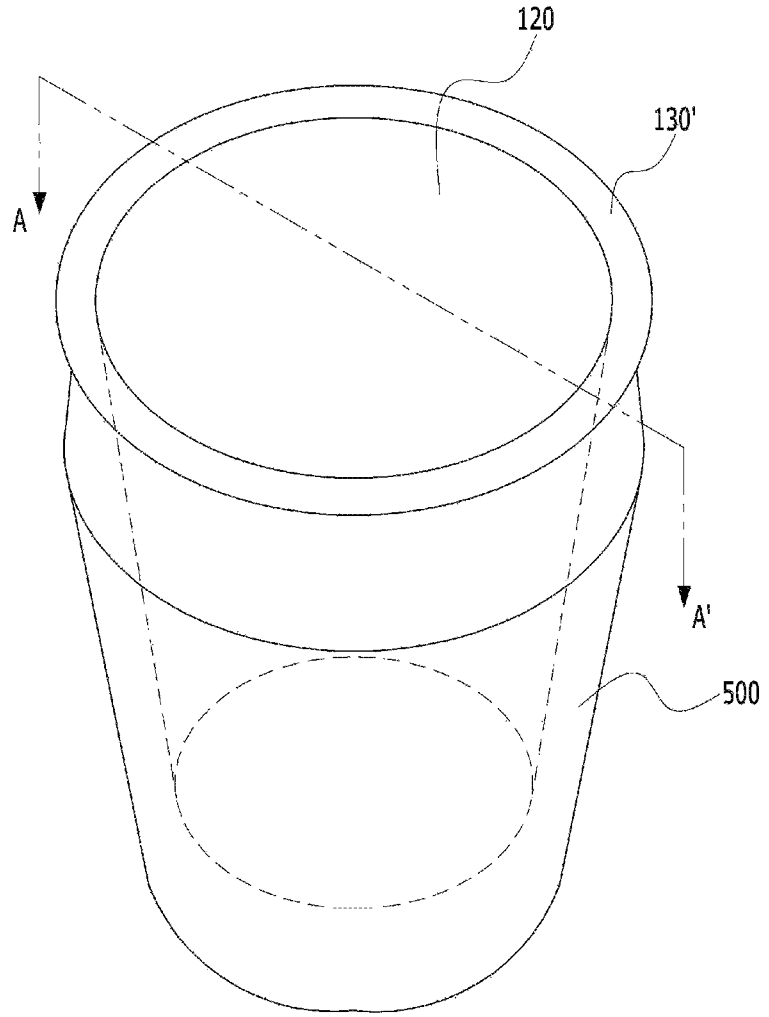
FIG. 2 is an assembled perspective view of the paper cup having the dual structure according to one embodiment of the present invention.
Figure 3:
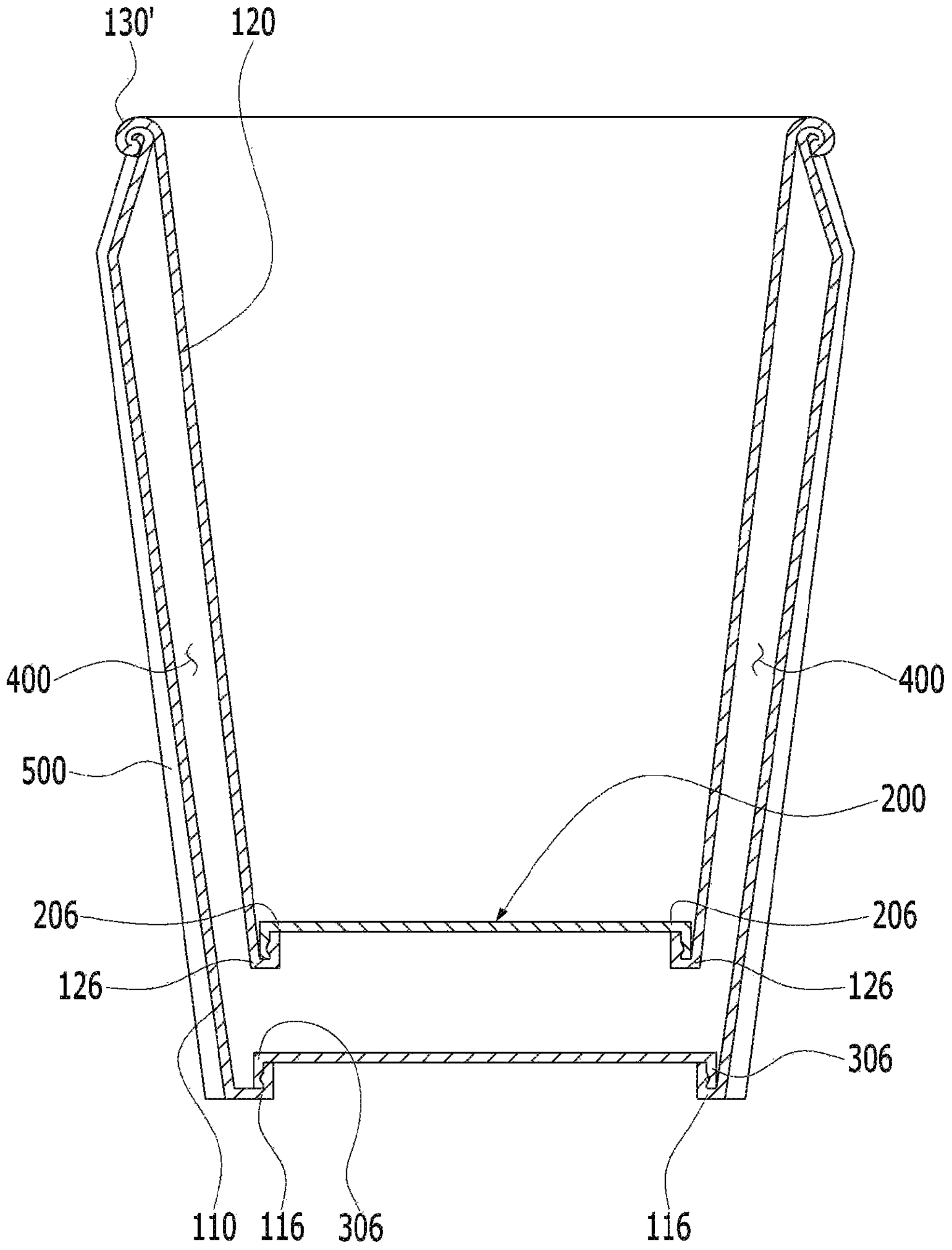
FIG. 3 is a cross-sectional view of the paper cup having the dual structure of FIG. 2, taken along line A-A'.
Figure 4:
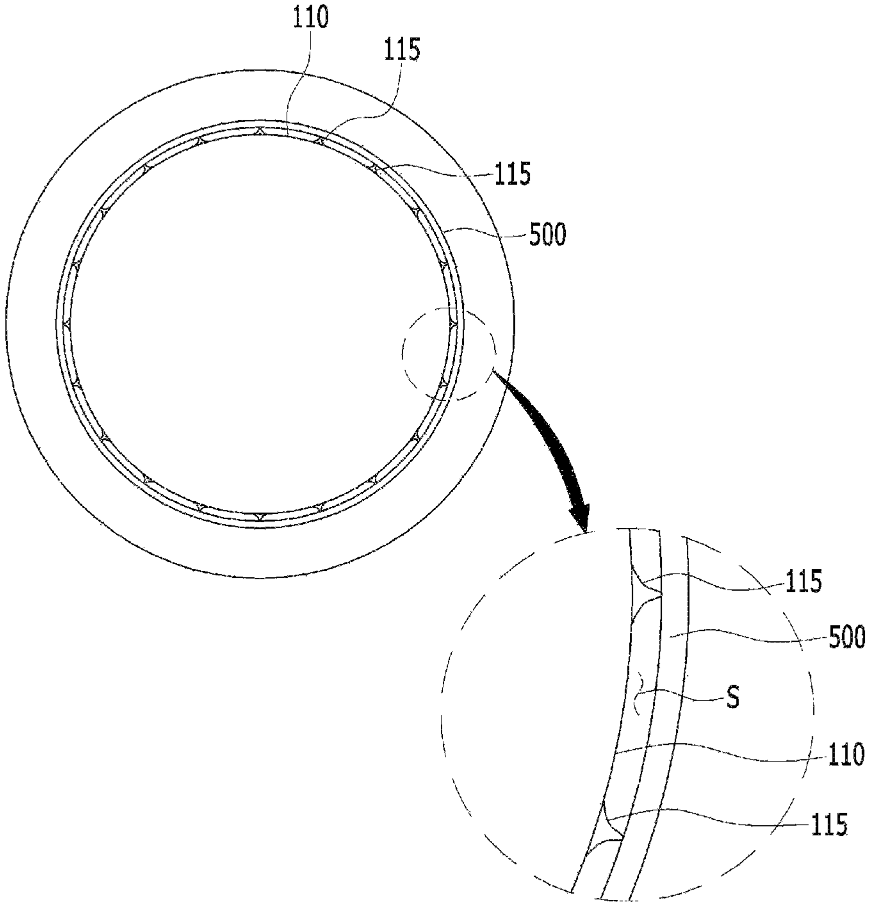
FIG. 4 is a bottom view of the paper cup having the dual structure according to one embodiment of the present invention.

FIGS. 1 and 2 are assembled perspective views of a paper cup having a dual structure according to one embodiment of the present invention, FIG. 3 is a cross-sectional view of the paper cup having the dual structure of FIG. 2, taken along line A-A', and FIG. 4 is a bottom view of the paper cup having the dual structure according to one embodiment of the present invention.

Referring to FIGS. 1 to 3, an inner paper part 110 has a plurality of diameter adjusting portions 115 formed at predetermined angular intervals 115. The inner paper part 110 is not directly gripped by a user when the user uses the paper cup having the dual structure according to one embodiment of the present invention, and substantially determines the shape of the outer surface of the paper cup. The diameter adjusting portions 115 may be formed to protrude from the lower end of the inner paper part 110 in a radially outward direction. By forming the diameter adjusting portions 115 to protrude from the lower end of the inner paper part 110 in the radially outward direction, the paper cup having the dual structure according to one embodiment of the present invention does not have a truncated conical shape, but has a shape, the diameter of the outer circumferential surface of which is increased as it moves from the top of the paper cup to a designated height and is then decreased as it moves from a height, at which the diameter adjusting portions 115 are formed, to the bottom of the paper cup, making it easy for the user to grip the paper cup. The inner paper part 110 may be gripped by the user, or a grip part 500 may be coupled to the inner paper part 110 so as to cover the outer surface of the inner paper part 110 and thus enable the user to grip the grip part 500. Further, the diameter adjusting portions protrude in the radially outward direction so as to expand the volume of an adiabatic space 400, thereby being capable of improving the thermal insulation property of the paper cup according to one embodiment of the present invention. The adiabatic space 400 will be described later.

In the following description of the present invention, the terms 'paper cup' and 'paper member' generally mean a paper material, but are not limited thereto, and other members, which are easily bent and rolled, like the paper material, may be used.

Further, the paper cup includes a drink receiving part 120 formed to extend from one end of the inner paper part 110 and to be bent towards the inner portion of the inner paper part 110. The drink receiving part 120 constitutes the inner side surface of the paper cup having the dual structure, and is formed such that the diameter of the cross-section thereof is decreased as it moves from the upper portion of the paper cup toward the lower portion of the inside of the paper cup. The drink receiving part 120 is a part of the paper cup which substantially contains a drink, and in order to prevent the paper material on the inner surface of the paper cup that the drink contacts from becoming wet, the drink receiving part 120 may be coated with a waterproof material.

Further, a drinking part 130' is formed at a boundary between the inner paper part 110 and the drink receiving part 120. The drinking part 130' directly contacts the user's mouth and thus serves to enable the user to drink the drink contained in the drink receiving part 120 when the paper cup having the dual structure according to one embodiment of the present invention is tilted. The drinking part 130' may be rolled in the radially outward direction of the drink receiving part 120. By rolling the drinking part 130' in the radially outward direction of the drink receiving part 120 into a ring shape, when the user drinks the drink in the paper cup, the user does not feel discomfort due to contact of the user's mouth with a corner, and when a plurality of paper cups is stacked for storage, it is easy to count the number of individual paper cups and to separate the stacked paper cups.

Referring to FIG. 2, the grip part 500 is formed to surround the outer surface of the inner paper part 110. The grip part 500 is a part of the paper cup having the dual structure according to one embodiment of the present invention, which is directly gripped by a user with his/her hand. The user may drink the drink contained in the cup while gripping the grip part 500 with his/her fingers so as to prevent the paper cup from falling. The grip part 500 surrounds the outer surface of the inner paper part 110, and thus, the diameter adjusting portions 115 constituting the inner paper part 110 do not directly contact the user's hand. Therefore, discomfort that the user may feel due to direct contact between the diameter adjusting portions 115 and the user's hand may be minimized.

Further, a first bottom part 200 is formed at one end of the drink receiving part 120. The first bottom part 200 is formed to be adhesively coupled to one end of the drink receiving part 120 so as to alternate with the end of the drink receiving part 120, and thereby, the drink may be contained in an inner space formed by coupling the drink receiving part 120 and the first bottom part 200 to each other. Here, alternating adhesive coupling means that one end of the drink receiving part 120 is bent upwards to form an upwardly bent portion 126, and the outer circumferential surface of the first bottom part 200 is bent downwards to form a downwardly bent portion 206 so that the upwardly bent portion 126 and the downwardly bent portion 206 are coupled to each other in directions engaging with each other.

Meanwhile, a second bottom part 300 is formed at one end of the inner paper part 110. The second bottom part 300 is formed to be adhesively coupled to one end of the inner paper part 110 so as to alternate with the end of the inner paper part 110, and alternating adhesive coupling means that one end of the inner paper part 110 is bent upwards to form an upwardly bent portion 116, and the outer circumferential surface of the second bottom part 300 is bent downwards to form a downwardly bent portion 306 so that the upwardly bent portion 116 and the downwardly bent portion 306 are coupled to each other in directions engaging with each other. Thereby, the inside of the paper cup having the dual structure according to one embodiment of the present invention is sealed by the first bottom part 200 and the second bottom part 300, thereby being capable of forming the adiabatic space 400. The adiabatic space 400 means a space surrounded by the drink receiving part 120, the first bottom part 200, the inner paper part 110 and the second bottom part 300. The adiabatic space 400 may be filled with air, and air having low thermal conductivity minimizes conduction of heat from the drink contained in the drink receiving part 120. By minimizing conduction of heat from the drink contained in the drink receiving part 120 to the inner paper part 110 and the grip part 500, the user may drink a hot drink for a long time, and when the user grips the inner paper part 110 or the grip part 500 with his/her hand, the user receives only the minimum amount of heat transmitted from the drink, and may thus safely drink the drink without burning his/her hand.

Referring to FIG. 3, the adiabatic space 400 formed between the inner paper part 110 and the drink receiving part 120 may have a regular thickness. When the drink receiving part 120 has a regular thickness, the diameter of the lower portion of the paper cup formed by the second bottom part

300 may be less than the diameter of the upper portion of the paper cup formed by the drinking part 130', and thus the user may stably grip the paper cup having the dual structure according to one embodiment of the present invention.

Referring to FIG. 4, the grip part 500 may be formed to be coupled to the regions of the diameter adjusting portions 115 of the inner paper part 110, which protrude in the radially outward direction, so as to cover the outer surface of the inner paper part 110. Therefore, a separation space S may be formed between the inner paper part 110 and the grip part 500, and this separation space S may further improve the adiabatic effect in addition to the adiabatic space 400.

Figure 5:
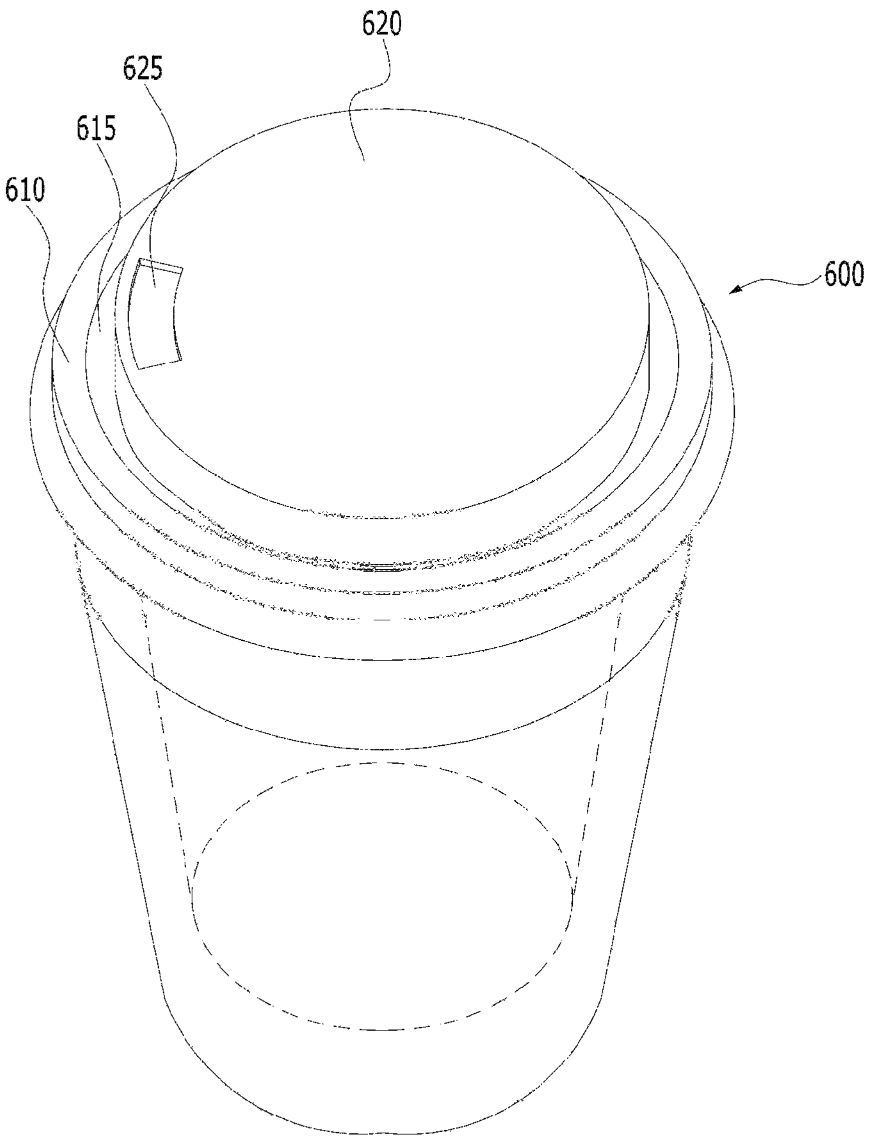
FIG. 5 is an assembled perspective view of the paper cup having the dual structure according to one embodiment of the present invention.
Figure 6:
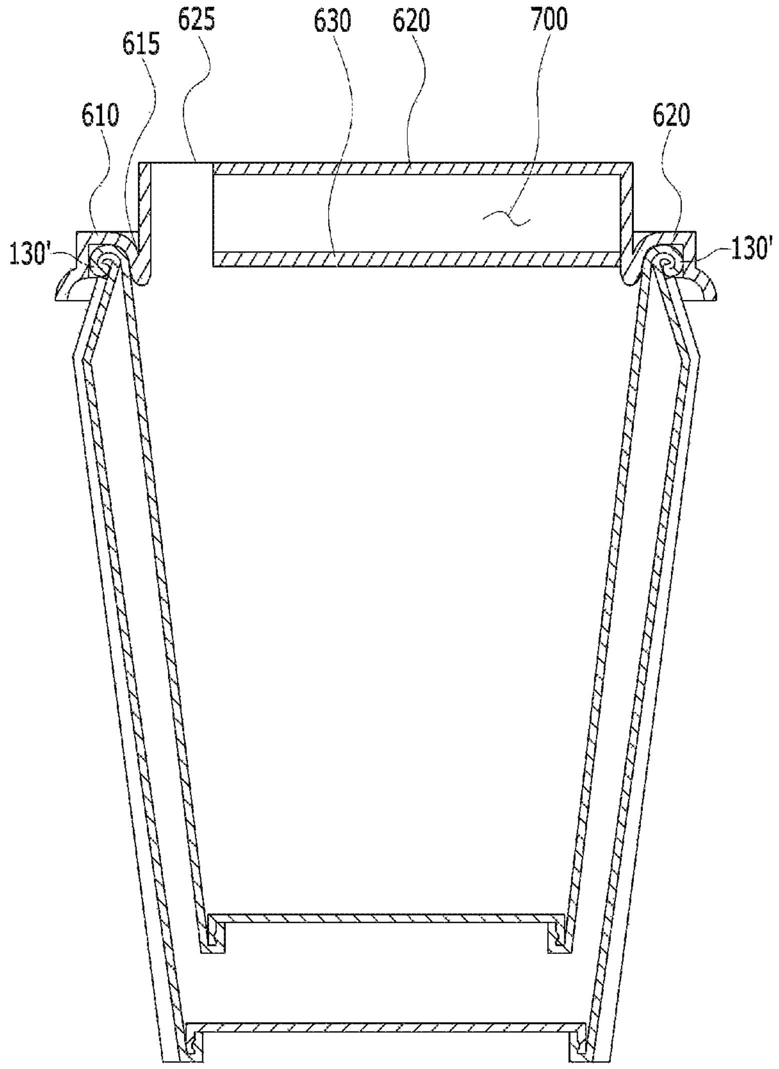
FIG. 6 is a cross-sectional view of the paper cup having the dual structure according to one embodiment of the present invention.

FIG. 5 is an assembled perspective view of the paper cup having the dual structure according to one embodiment of the present invention, and FIG. 6 is a cross-sectional view of the paper cup having the dual structure according to one embodiment of the present invention.

Referring to FIGS. 5 and 6, a lid part 600 may include a first protrusion 610. The first protrusion 610 may be fitted on the drinking part 130' rolled in the radially outward direction at the boundary between the inner paper part 110 and the drink receiving part 120. By fitting the first protrusion 610 on the drinking part 130', the lid part 600 may stably cover the paper cup, and may thus prevent the drink from leaking to the outside.

Further, a second protrusion 620 is formed consecutively with the first protrusion 610. The second protrusion is connected to the first protrusion 610 through a recess 615, and the first protrusion 610 may be fitted on the drinking part 130' through the recess 615. The second protrusion 620 is formed to have a height greater than that of the first protrusion 610, and has a shape similar to that of a lid of a general plastic cup. A through hole 625 is formed through the upper surface of the second protrusion 620, and the user may drink the drink contained in the drink receiving part 120 via the through hole 625. When the lid part 600 is separated from the drinking part 130', the user may drink the drink directly from the drinking part 130' with his/her mouth contacting the drinking part 130'.

Further, an adiabatic part 630 having a regular thickness is formed on the lower surface of the lid part 600. The adiabatic part 630 is separated from the second protrusion 620, and a lid adiabatic space 700 is formed in a separation space between the adiabatic part 630 and the second protrusion 620. The lid adiabatic space 700 formed by the adiabatic part 630 minimizes leakage of heat or cold air from the drink contained in the drink receiving part 120 to the outside, and thereby forms a sufficient amount of an adiabatic layer at the entire circumference of the drink contained in the drink receiving part 120 together with the adiabatic space 400 formed between the inner paper part 110 and the drink receiving part 120, thereby being capable of maximizing the adiabatic effect.

Hereinafter, a method for manufacturing the paper cup having the dual structure according to one embodiment of the present invention will be described in detail.

Figure 7:
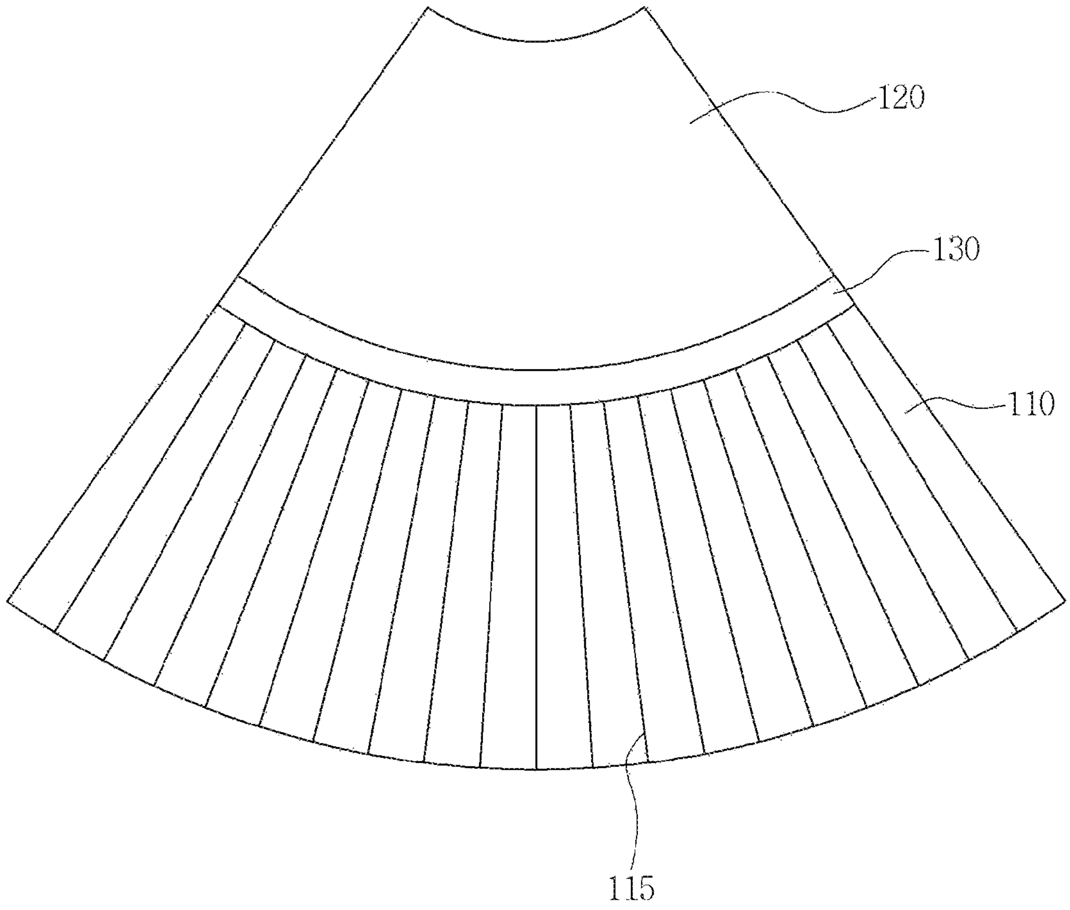
FIG. 7 is a development view of the paper cup having the dual structure according to one embodiment of the present invention.
Figure 8:
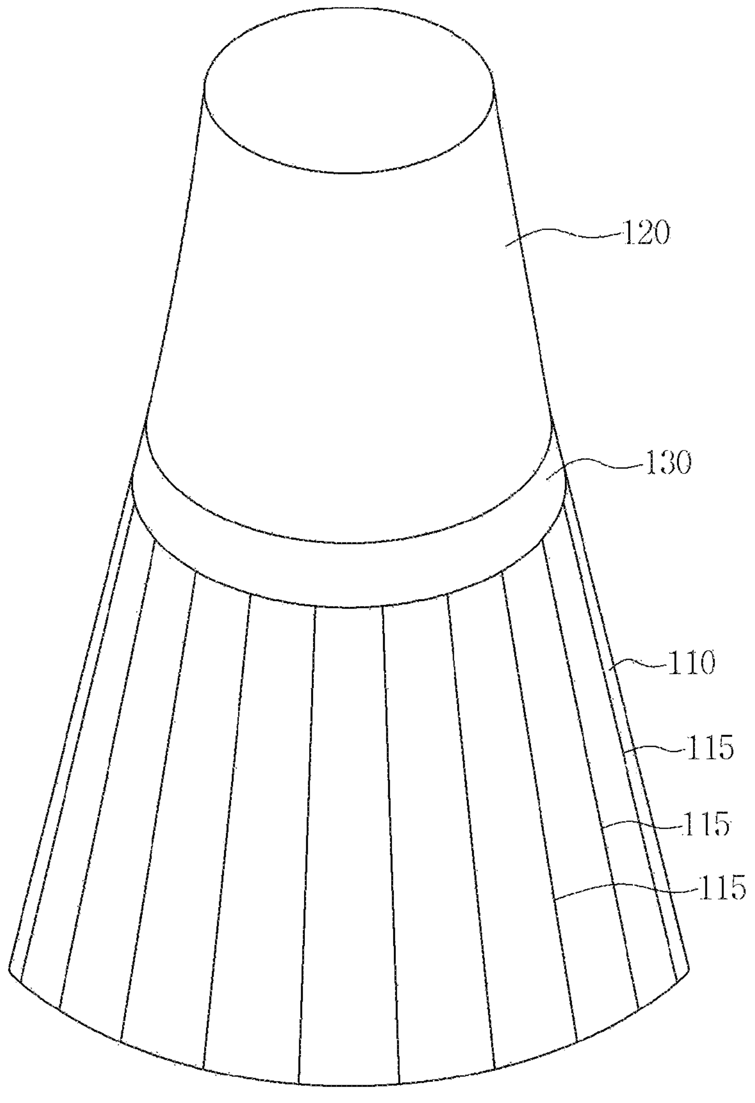
FIG. 8 is an assembled perspective view of the paper cup having the dual structure according to one embodiment of the present invention.
Figure 9:
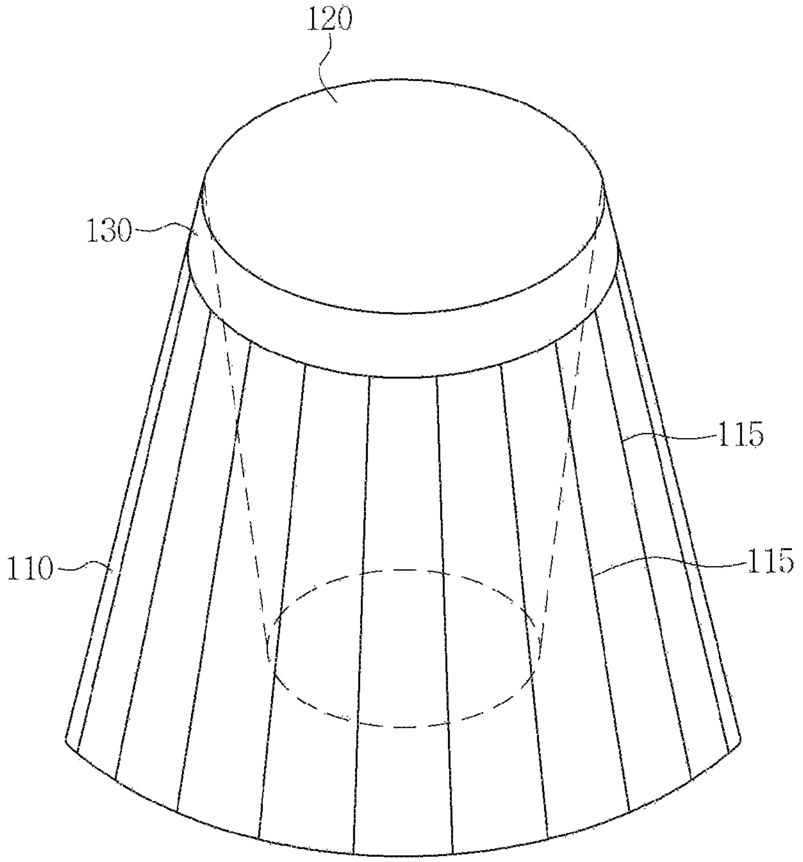
FIG. 9 is an assembled perspective view of the paper cup having the dual structure according to one embodiment of the present invention.
Figure 10:
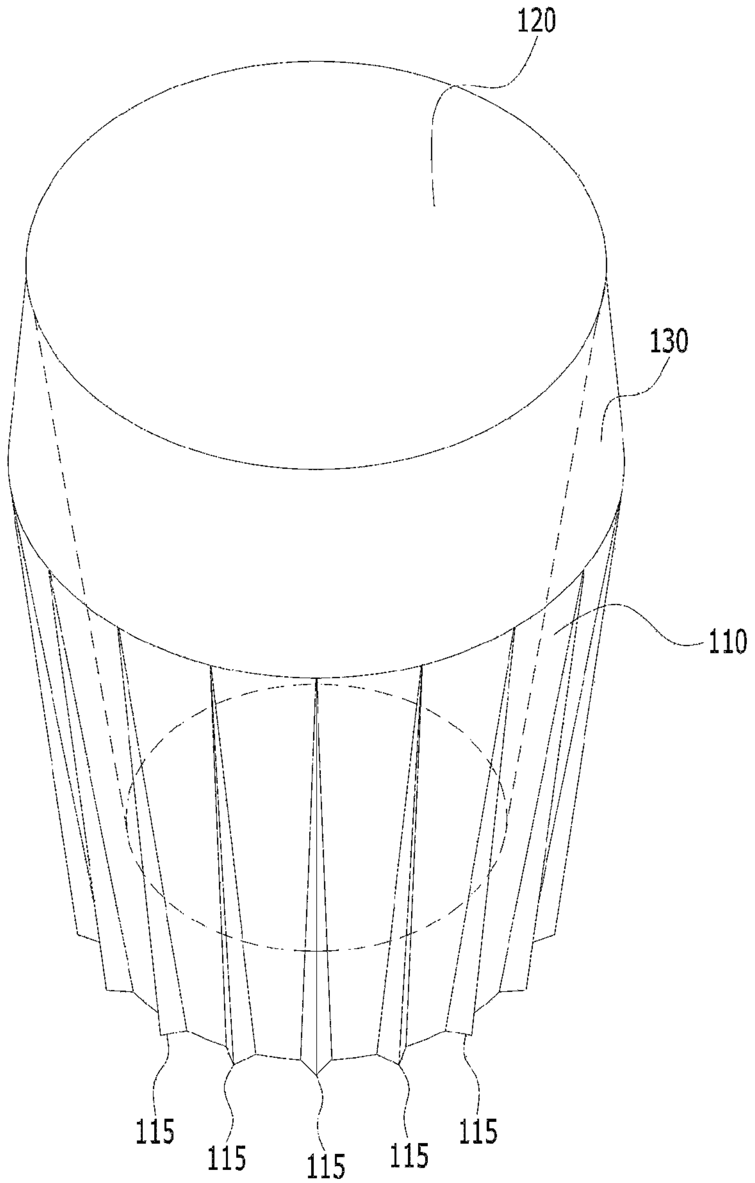
FIG. 10 is an assembled perspective view of the paper cup having the dual structure according to one embodiment of the present invention.
Figure 11:
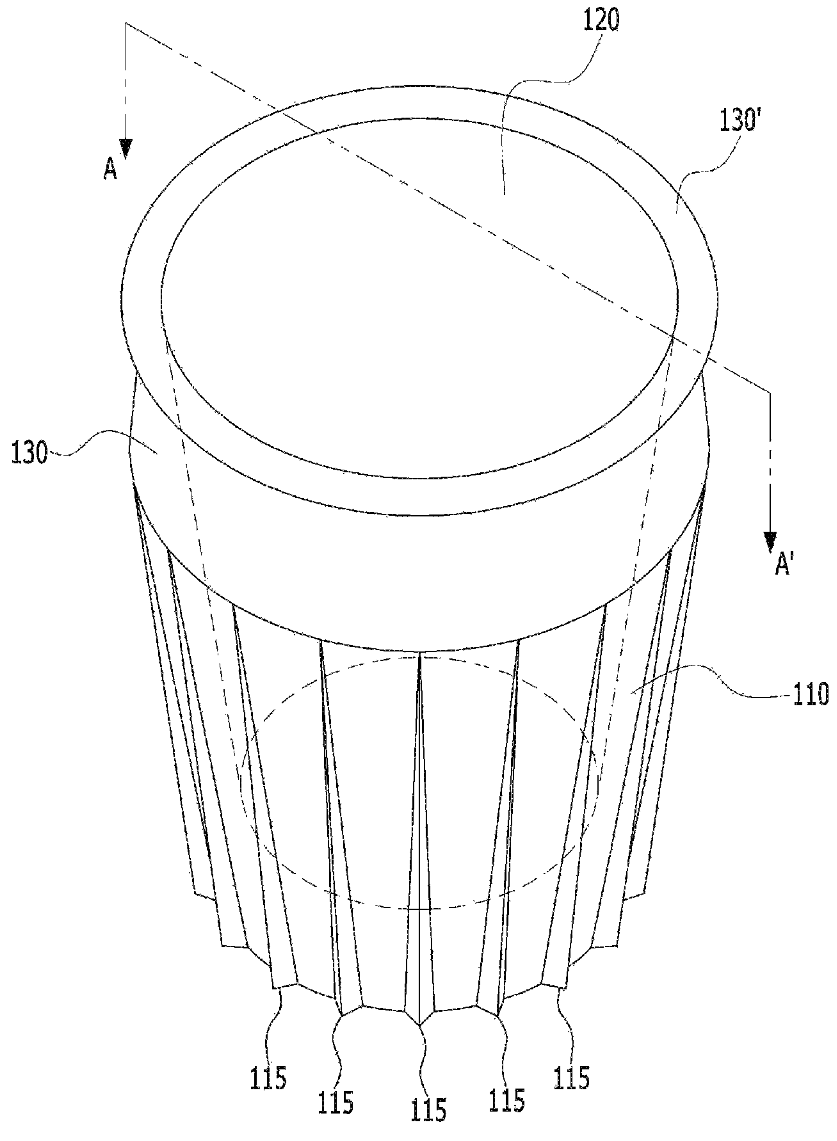
FIG. 11 is an assembled perspective view of the paper cup having the dual structure according to one embodiment of the present invention.
Figure 12:
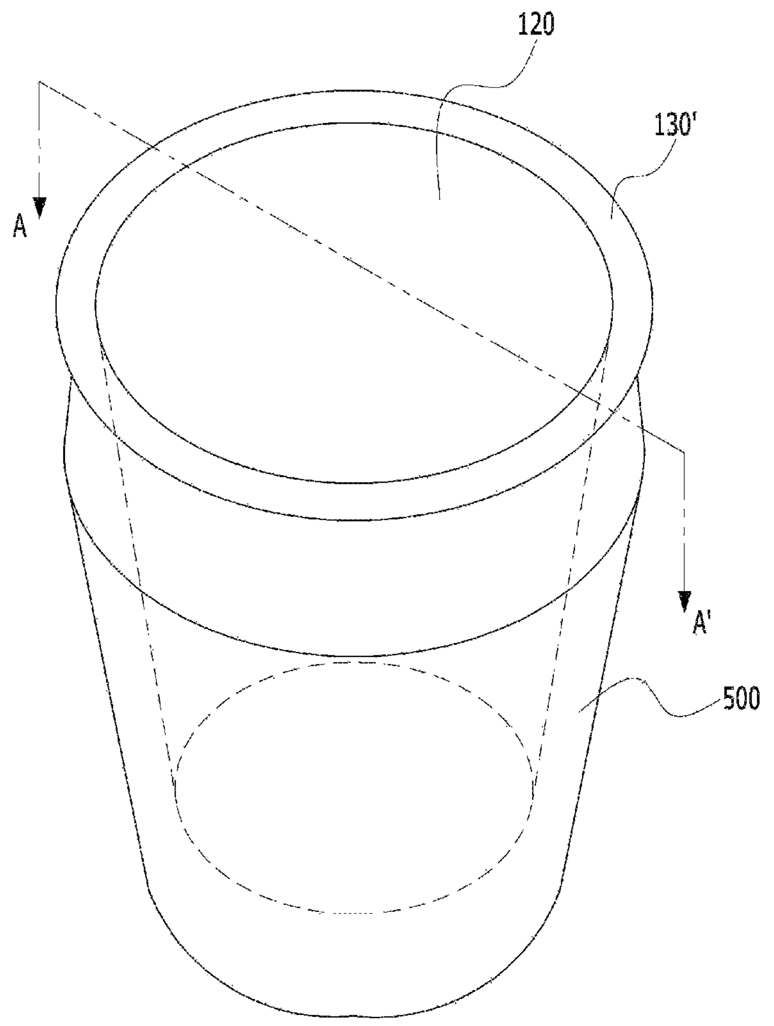
FIG. 12 is an assembled perspective view of the paper cup having the dual structure according to one embodiment of the present invention.
Figure 13:
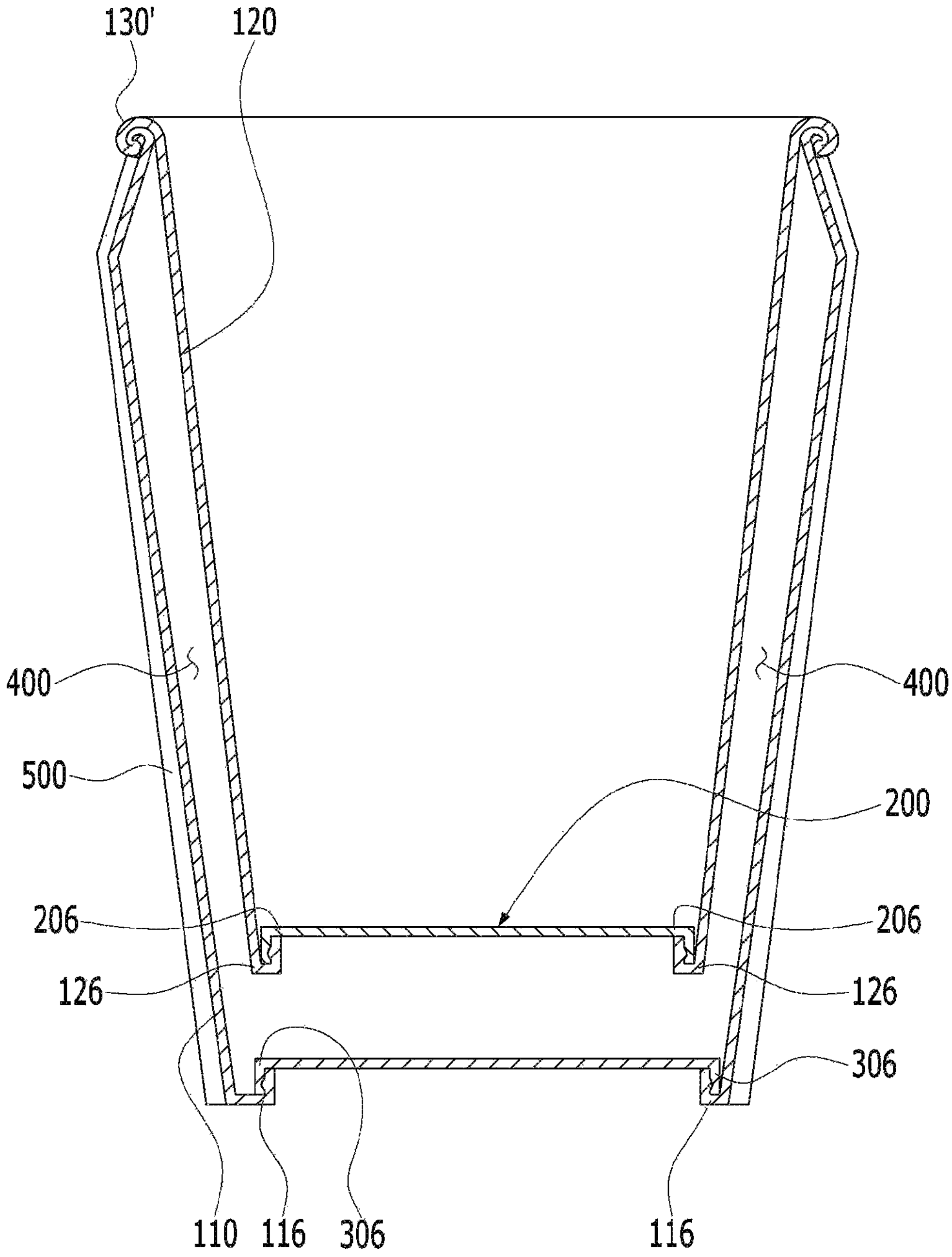
FIG. 13 is a cross-sectional view of the paper cup having the dual structure according to one embodiment of the present invention.
Figure 14:
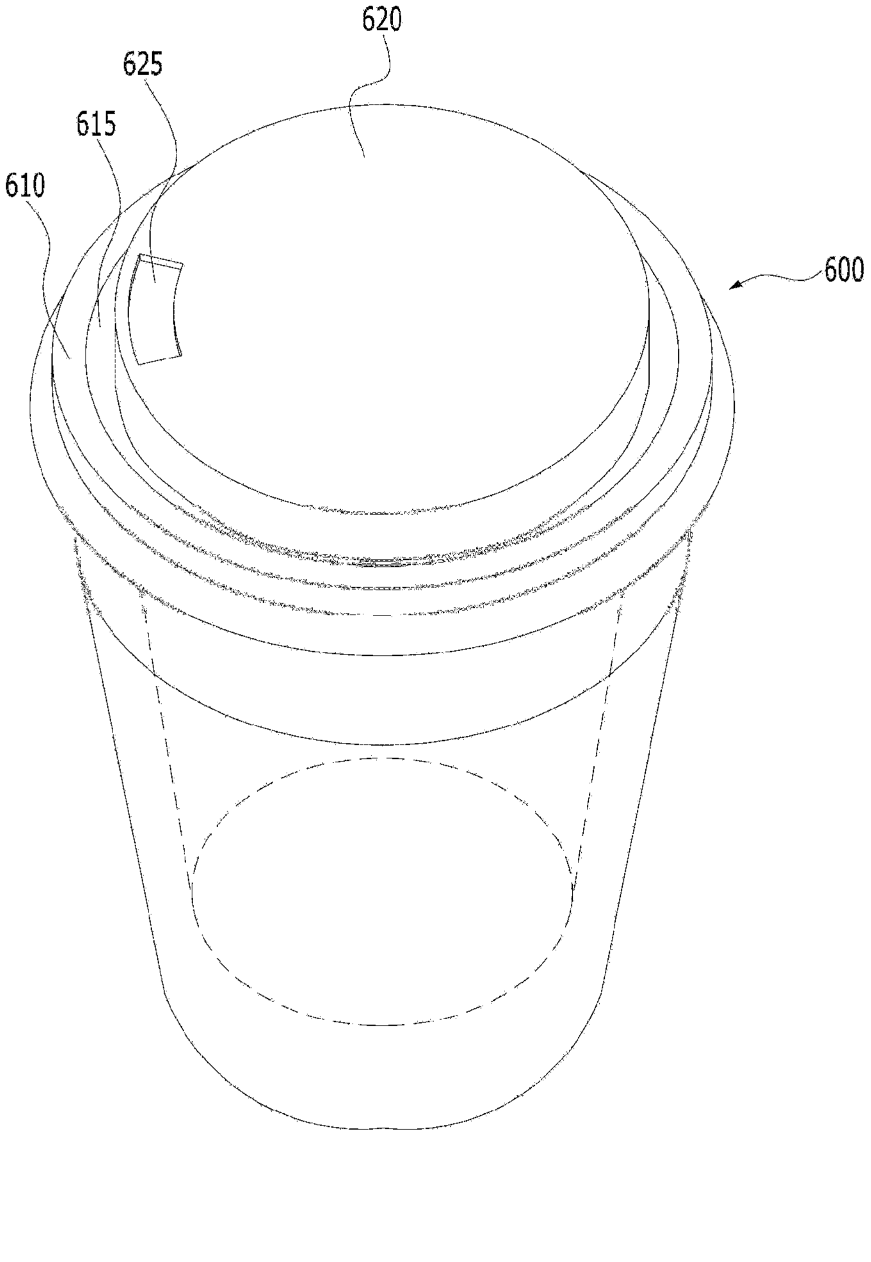
FIG. 14 is an assembled perspective view of the paper cup having the dual structure according to one embodiment of the present invention.
Figure 15:
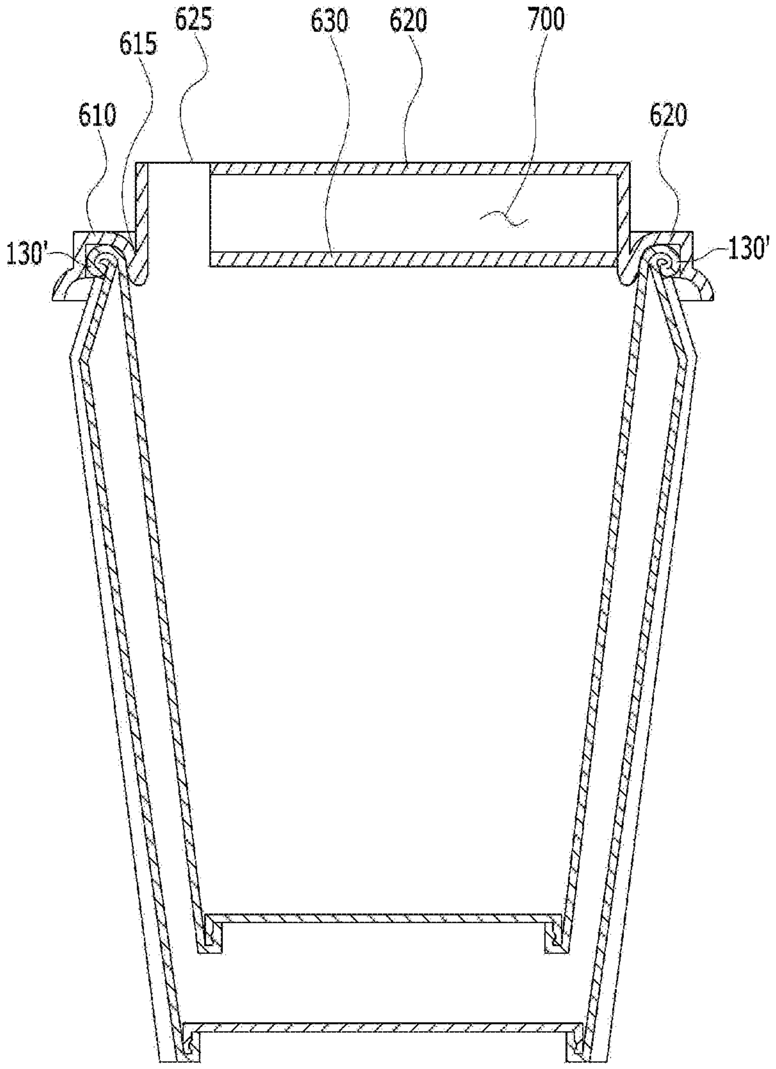
FIG. 15 a cross-sectional view of the paper cup having the dual structure according to one embodiment of the present invention.

FIG. 7 is a development view of the paper cup having the dual structure according to one embodiment of the present invention, FIG. 8 is an assembled perspective view of the paper cup having the dual structure according to one embodiment of the present invention, FIG. 9 is an assembled perspective view of the paper cup having the dual structure according to one embodiment of the present invention, FIG. 10 is an assembled perspective view of the paper cup having the dual structure according to one embodiment of the present invention, FIG. 11 is an assembled perspective view of the paper cup having the dual structure according to one embodiment of the present invention, FIG. 12 is an assembled perspective view of the paper cup having the dual structure according to one embodiment of the present invention, FIG. 13 is a cross-sectional view of the paper cup having the dual structure according to one embodiment of the present invention, FIG. 14 is an assembled perspective view of the paper cup having the dual structure according to one embodiment of the present invention, and FIG. 15 a cross-sectional view of the paper cup having the dual structure according to one embodiment of the present invention.

The method for manufacturing the paper cup having the dual structure according to one embodiment of the present invention includes rolling one paper member, in which the inner paper part 110 and the drink receiving part 120 are connected, into a truncated conical shape. Referring to FIGS. 7 and 8, the inner paper part 110 and the drink receiving part 120 are formed of one paper member. Because the inner paper part 110 and the drink receiving part 120 are formed of a single paper member, the cumbersomeness of preparing two kinds of members having respective standards to manufacture the paper cup having the dual structure according to one embodiment of the present invention may be avoided, a process for manufacturing the paper cup having the dual structure may be simplified, and the paper cup may have excellent sealability, which is advantageous in the formation of the adiabatic space 400.

Referring to FIG. 9, the method for manufacturing the paper cup having the dual structure according to one embodiment of the present invention includes folding the drink receiving part 120 towards the inner portion of the inner paper part 110 along the boundary at which the inner paper part 110 and the drink receiving part 120 come into contact with each other linearly (come into linear contact with each other). In the paper member rolled into the truncated conical shape, the upper and lower surfaces of which are open, the drink receiving part 120 is folded in the inward direction of the truncated conical paper member along the boundary at which the inner paper part 110 and the drink receiving part 120 come into linear contact with each other. Thereby, the side surface of a space in which a drink is to be contained is formed.

Further, referring to FIG. 10, a plurality of diameter adjusting portions 115 may be formed at predetermined angular intervals on one surface of the inner paper part 110, and by forming these diameter adjusting portions 115 in the radially outward direction of the lower end of the inner paper part 110, the diameter of the lower end of the inner paper part 100 may be adjusted, and the paper cup having the dual structure does not have the truncated conical shape anymore but has a structure, the outer diameter of the outer circumference of which is decreased as it moves towards the lower portion of the inner paper part 110 like the shape of a general paper cup. Therefore, the user may conveniently hold the paper cup having the above-described shape according to one embodiment of the present invention in his/her hand. Further, the user may use the paper cup having the dual structure according to one embodiment of the present invention by directly gripping the inner paper part 110, and in some cases, may use the paper cup by gripping the grip part 500, which is adhesively coupled to the inner paper part 110 so as to cover the outer surface of the inner paper part 110.

Further, referring to FIG. 11, the method for manufacturing the paper cup having the dual structure according to one embodiment of the present invention may include forming the drinking part 130' by rolling a region between the inner paper part 110 and the drink receiving part 120 in the radially outward direction. If a region of the paper cup, that comes into contact with the user's mouth, is pointed, the pointed region may cause discomfort when the user drink the drink contained in the paper cup. Therefore, by forming the drinking part 130' in a ring shape by rolling a boundary 130 between the inner paper part 110 and the drink receiving part 120 in the radially outward direction, discomfort that the user feels due to contact between the user's mouth and a corner when the user drinks the drink contained in the paper cup may be avoided, and when a plurality of paper cups is stacked to be stored, it is easy to count the number of individual paper cups or to separate the stacked paper cups.

Further, referring to FIG. 13, the method for manufacturing the paper cup having the dual structure according to one embodiment of the present invention may include forming the first bottom part 200 at one end of the drink receiving part 120 to be adhesively coupled to the end of the drink receiving part 120 so as to alternate with the end of the drink receiving part 120. That is, one end of the drink receiving part 120 is bent upwards to form the upwardly bent portion 126, and the outer circumferential surface of the first bottom part 200 is bent downwards to form the downwardly bent portion 206 so that the upwardly bent portion 126 and the downwardly bent portion 206 are adhesively coupled to each other so as to be engaged with each other. Thereby, the drink receiving part 120 and the first bottom part 200 may be firmly coupled so as not to be separated from each other, thus being capable of forming an inner space in which a drink is contained. The drink receiving part 120 and the first bottom part 200, with which the drink contained in the inner space comes into contact, may be coated with a waterproof material so that the paper cup is not soaked with the drink.

Further, the method for manufacturing the paper cup having the dual structure according to one embodiment of the present invention may include forming the second bottom part 300 formed at one end of the inner paper part 110 to be adhesively coupled to the end of the inner paper part 110 so as to alternate with the end of the inner paper part 110. That is, one end of the inner paper part 110 is bent upwards to form the upwardly bent portion 116, and the outer circumferential surface of the second bottom part 300 is bent downwards to form the downwardly bent portion 306 so that the upwardly bent portion 116 and the downwardly bent portion 306 are adhesively coupled to each other so as to be engaged with each other. Thereby, the inner paper part 110 and the second bottom part 300 may be firmly coupled so as not to be separated from each other. By forming the first bottom part 200 and the second bottom part 300, a space sealed by the first bottom part 200, the drink receiving part 120, the inner paper part 110 and the second bottom part 300 may be formed, and thus, the adiabatic space 400 may be formed between the inner paper part 110 and the drink receiving part 120. Formation of the adiabatic space 400 may minimize the loss of heat from the drink contained in the drink receiving part 120, and the user may drink the drink at an appropriate temperature for a long time.

The adiabatic space 400 between the inner part 110 and the drinking part 130' may be formed to have a regular thickness. Because the adiabatic space 400 is formed to have a regular thickness, the diameter of the lower portion of the paper cup formed by the second bottom part 300 may be less than the diameter of the upper portion of the paper cup formed by the drinking part 130', and thus the user may stably grip the paper cup.

Further, the method for manufacturing the paper cup having the dual structure according to one embodiment of the present invention may include adhesively coupling the grip part 500 to the inner paper part 110 so as to cover the outer surface of the inner paper part 110. By coupling the grip part 500 to the inner paper part 110 so as to cover the outer surface of the inner paper part 110, heat that has passed through the inner space 400 must pass through the grip part 500 again, and thus an additional adiabatic effect may be exhibited, and the user may stably grip the paper cup. Here, the grip part 500 is coupled to the protruding regions of the diameter adjusting portions 115, which protrude in the radially outward direction of the inner paper part 110, thus being capable of covering the outer surface of the inner paper part 110. When the grip part 500 is coupled to the protruding regions of the diameter adjusting portions 115, the separation space S may be formed between the inner paper part 110 and the grip part 500, and the adiabatic space 400 and the separation space S formed through the method for manufacturing the paper cup having the dual structure according to one embodiment of the present invention may maximize the adiabatic effect of the paper cup having the dual structure.

Further, referring to FIGS. 14 and 15, the method for manufacturing the paper cup having the dual structure according to one embodiment of the present invention may further include coupling the lid part 600, which includes the first protrusion 610 fitted on the drinking part 130', the second protrusion 620 connected to the first protrusion 610 through the recess 615 and provided with the through hole 625 formed through the upper surface thereof, and the adiabatic part 630 configured to have a regular thickness and formed on the lower surface of the lid part 600 so as to form the lid adiabatic space 700 therein, to the drinking part 130'.

The lid part 600 may include the first protrusion 610. The first protrusion 610 may be fitted on the drinking part 130' rolled in the radially outward direction at the boundary between the inner paper part 110 and the drink receiving part 120. By fitting the first protrusion 610 on the drinking part 130', the lid part 600 may stably cover the paper cup, and may thus prevent the drink from leaking to the outside.

Further, the second protrusion 620 is formed consecutively with the first protrusion 610. The second protrusion is connected to the first protrusion 610 through the recess 615, and the first protrusion 610 may be fitted on the drinking part 130' through the recess 615. The second protrusion 620 is formed to have a height greater than that of the first protrusion 610, and has a shape similar to that of a lid of a general plastic cup. The through hole 625 is formed through the upper surface of the second protrusion 620, and the user may drink the drink contained in the drink receiving part 120 via the through hole 625. When the lid part 600 is separated from the drinking part 130', the user may drink the drink directly from the drinking part 130' with his/her mouth contacting the drinking part 130'.

Further, the adiabatic part 630 having a regular thickness is formed on the lower surface of the lid part 600. The adiabatic part 630 is separated from the second protrusion 620, and the lid adiabatic space 700 is formed in the separation space between the adiabatic part 630 and the second protrusion 620. The lid adiabatic space 700 formed by the adiabatic part 630 minimizes leakage of heat or cold air from the drink contained in the drink receiving part 120 to the outside, and thereby forms a sufficient amount of an adiabatic layer at the entire circumference of the drink contained in the drink receiving part 120 together with the adiabatic space 400 formed between the inner paper part 110 and the drink receiving part 120, thereby being capable of maximizing the adiabatic effect.

Hereinafter, a method for manufacturing a paper cup having a dual structure according to another embodiment of the present invention will be descried in detail.

Figure 16:
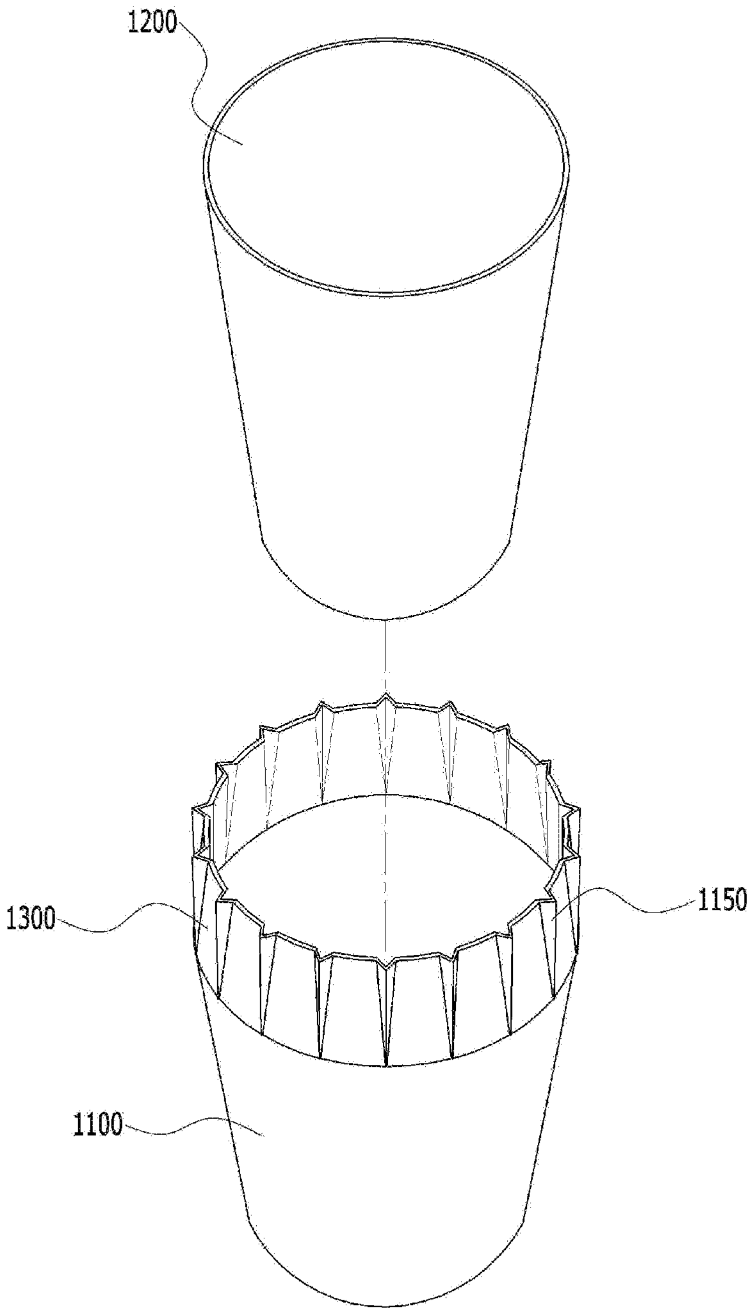
FIG. 16 is an exploded perspective view of a paper cup having a dual structure according to another embodiment of the present invention.
Figure 17:
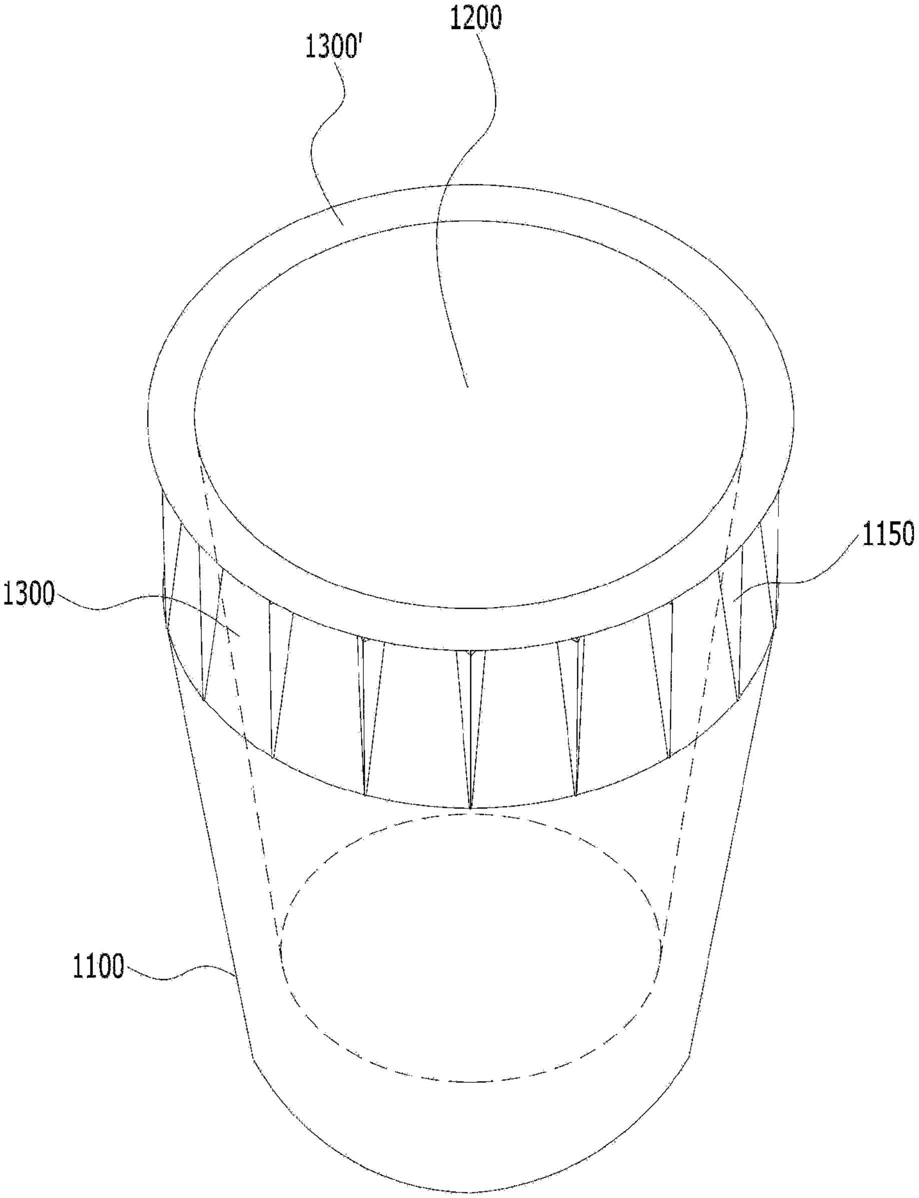
FIG. 17 is an assembled perspective view of the paper cup having the dual structure according to another embodiment of the present invention.
Figure 18:
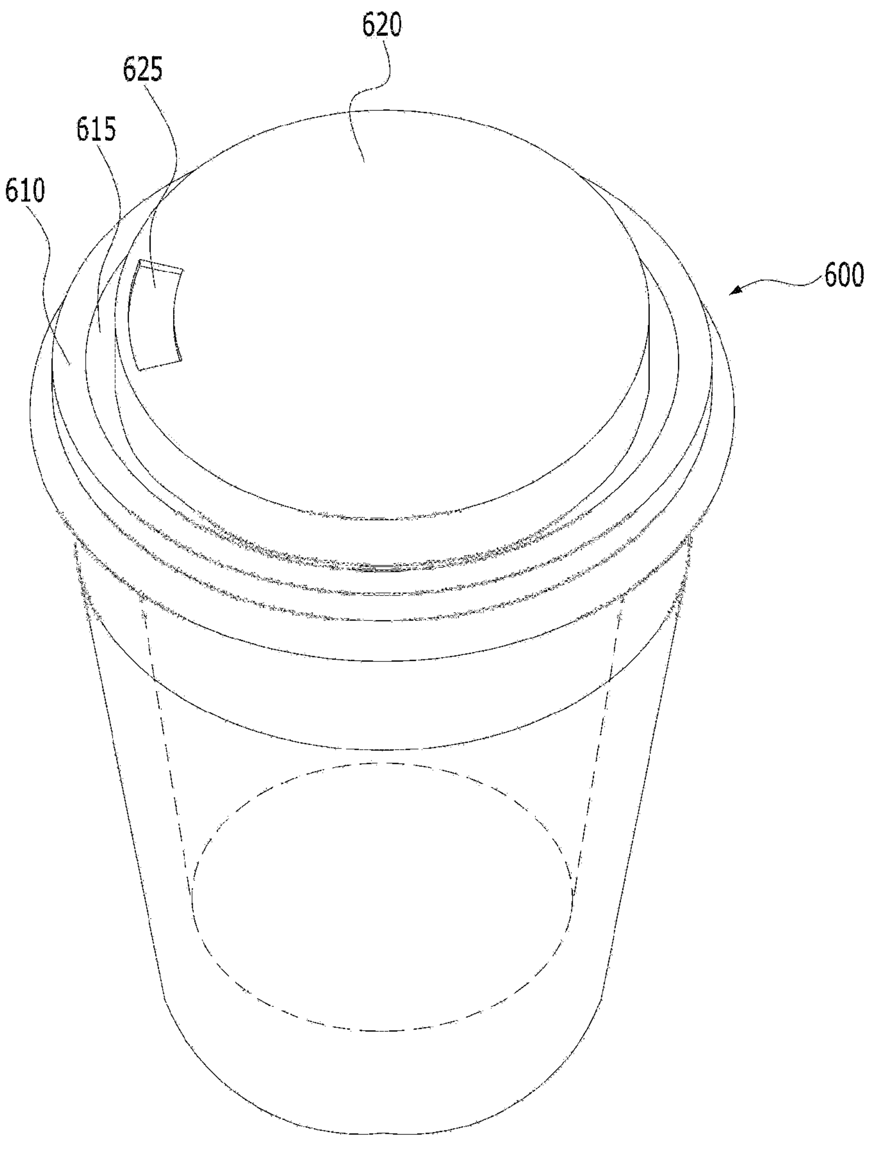
FIG. 18 is an assembled perspective view of the paper cup having the dual structure according to another embodiment of the present invention.
Figure 19:
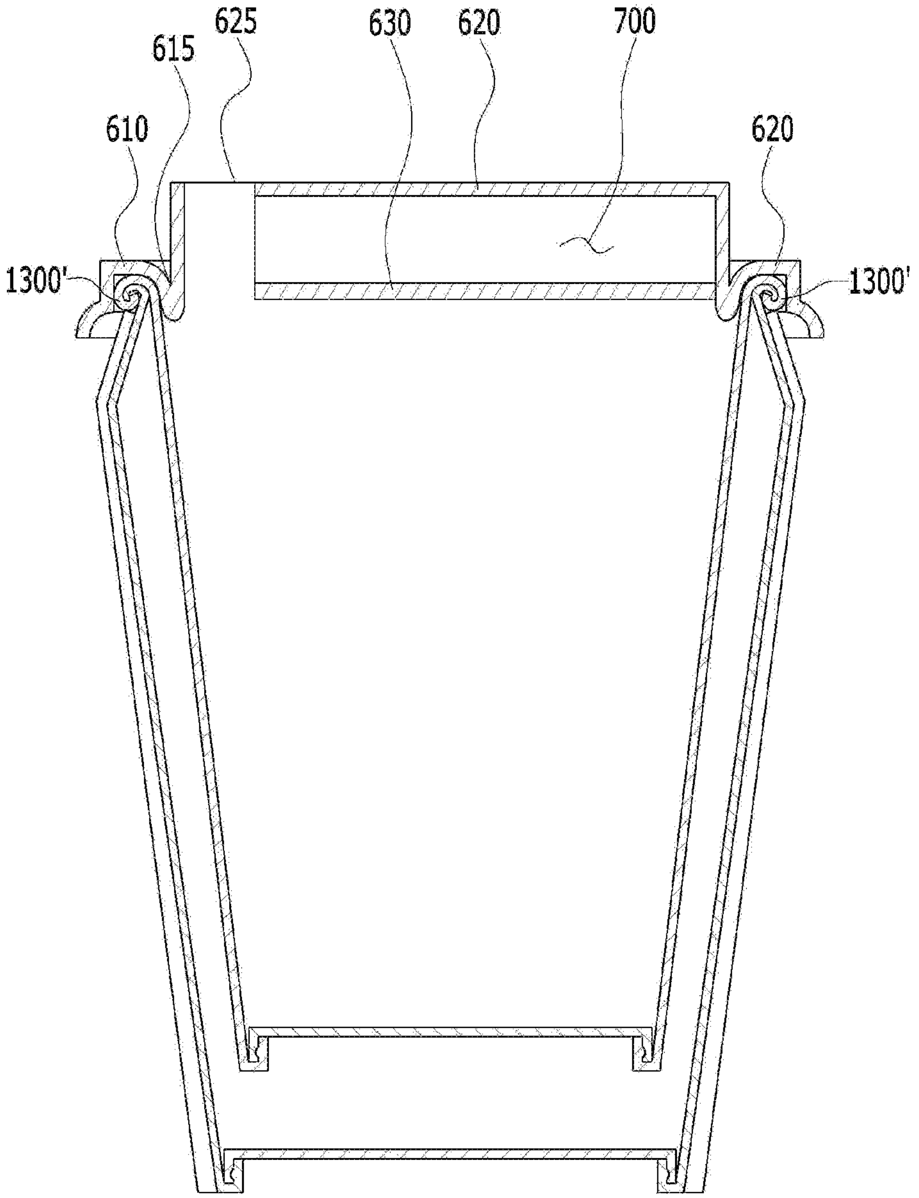
FIG. 19 is a cross-sectional view of the paper cup having the dual structure according to another embodiment of the present invention.

FIG. 16 is an exploded perspective view of the paper cup having the dual structure according to another embodiment of the present invention, FIG. 17 is an assembled perspective view of the paper cup having the dual structure according to another embodiment of the present invention, FIG. 18 is an assembled perspective view of the paper cup having the dual structure according to another embodiment of the present invention, and FIG. 19 is a cross-sectional view of the paper cup having the dual structure according to another embodiment of the present invention.

Referring to FIGS. 16 and 17, a plurality of diameter adjusting portions 1150 is formed at predetermined angular intervals on one surface of an outer cup 110 configured to constitute an inner paper part. The diameter adjusting portions 1150 are formed at a part of the outer surface of the outer cup 1100, and may protrude in the radially outward direction of the upper end of the outer cup 1100 so that the diameter of the outer circumference of the upper end of the outer cup 1100 is decreased (adjustment of the diameter of the outer cup). Further, an inner cup 1200 configured to contain a drink is inserted into the outer cup 1100 from the top of the outer cup 1100 (insertion of the inner cup). Here, the diameters of the upper portions of the outer cup 1100 and the inner cup 1200 may be equal to each other. If the diameters of the upper portions of the outer cup 1100 and the inner cup 1200 are equal to each other, a drinking part 1300' is easily formed when the inner cup 1200 is inserted into the outer cup 1100.

Thereafter, the drinking part 1300' is formed by rolling the outer circumferences of the outer cup 1100 and the inner cup 1220 in the radially outward direction (formation of the drinking part). By forming the drinking part 1300' in a ring shape, a user may conveniently drink the drink directly from the drinking part 1300' with his/her mouth contacting the drinking part 1300'. Further, when two members, i.e., the outer cup 1100 and the inner cup 1200, are used, as such, it is easy to form the drinking part 1300'.

When the drinking part 1300' is formed by rolling the outer circumferences of the outer cup 1100 and the inner cup 1220 in the radially outward direction, a space between the outer cup 1100 and the inner cup 1200 is sealed, thus forming an adiabatic space 400. Formation of the adiabatic space 400 may minimize the loss of heat from the drink contained in the inner cup 1200, and the user may drink the drink at an appropriate temperature for a long time.

The adiabatic space 400 between the outer cup 1100 and the inner cup 1200 may be formed to have a regular thickness. Because the adiabatic space 400 is formed to have a regular thickness, the diameter of the lower portion of the paper cup may be less than the diameter of the upper portion of the paper cup formed by the drinking part 1300', and thus the user may stably grip the paper cup.

Further, the method for manufacturing the paper cup having the dual structure according to another embodiment of the present invention may include adhesively coupling a grip part 500 to the outer cup 1100 so as to cover the outer surface of the outer cup 1100 (formation of the grip part). By coupling the grip part 500 to the outer cup 1100 so as to cover the outer surface of the outer cup 1100, heat that has passed through the inner space 400 must pass through the grip part 500 again, and thus an additional adiabatic effect may be exhibited and the user may stably grip the paper cup.

FIG. 18 is an assembled perspective view of the paper cup having the dual structure according to another embodiment of the present invention, and FIG. 19 is a cross-sectional view of the paper cup having the dual structure according to another embodiment of the present invention.

The method for manufacturing the paper cup having the dual structure according to another embodiment of the present invention may further include coupling a lid part 600 to the drinking part 1300'. Referring to FIGS. 17 and 18, the lid part 600 may include a first protrusion 610. The first protrusion 610 may be fitted on the drinking part 1300' rolling in the radially outward direction at the boundary between the outer cup 1100 and the inner cup 1200. By fitting the first protrusion 610 on the drinking part 1300', the lid part 600 may stably cover the paper cup, and may thus prevent the drink from leaking to the outside.

Further, a second protrusion 620 is formed consecutively with the first protrusion 610. The second protrusion 620 is connected to the first protrusion 610 through a recess 615, and the first protrusion 610 may be fitted on the drinking part 1300' through the recess 615. The second protrusion 620 is formed to have a height greater than that of the first protrusion 610, and has a shape similar to that of a lid of a general plastic cup. A through hole 625 is formed through the upper surface of the second protrusion 620, and the user may drink the drink contained in the drink receiving part 120 via the through hole 625. When the lid part 600 is separated from the drinking part 1300', the user may drink the drink directly from the drinking part 1300' with his/her mouth contacting the drinking part 1300'.

Further, an adiabatic part 630 having a regular thickness is formed on the lower surface of the lid part 600. The adiabatic part 630 is separated from the second protrusion 620, and a lid adiabatic space 700 is formed in the separation space between the adiabatic part 630 and the second protrusion 620. The lid adiabatic space 700 formed by the adiabatic part 630 minimizes the leakage of heat or cold air from the drink contained in the inner cup 1200 to the outside, and thereby forms a sufficient amount of an adiabatic layer at the entire circumference of the drink contained in the inner cup 1200 together with the adiabatic space 400 formed between the outer cup 1100 and the inner cup 1200, thereby being capable of maximizing the adiabatic effect.

Figure 20:
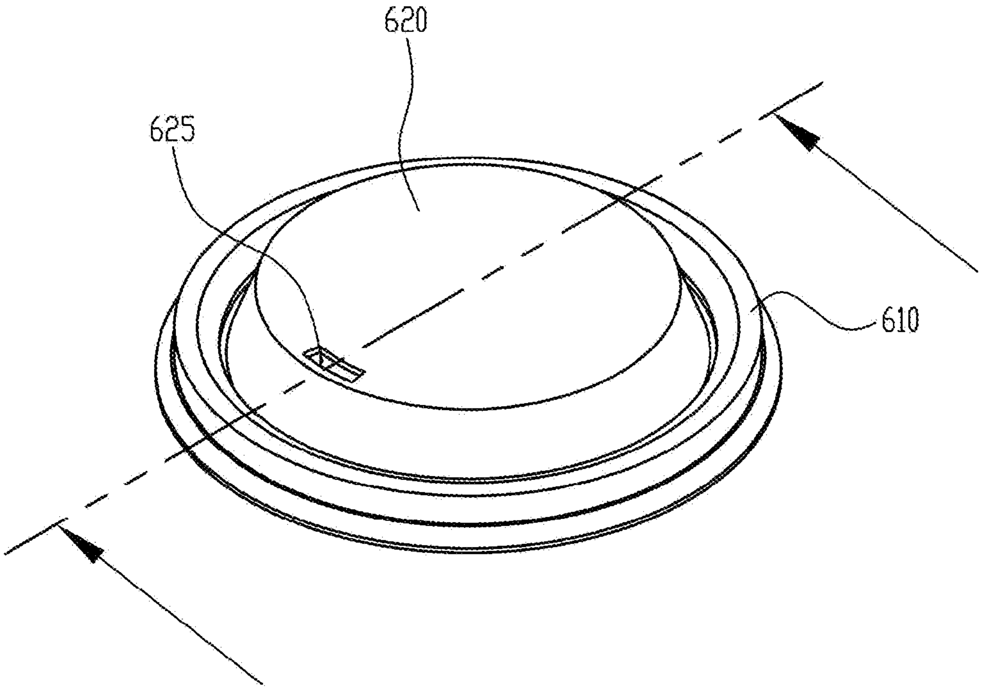
FIG. 20 is a perspective view of a lid part according to yet another embodiment of the present invention.
Figure 21:
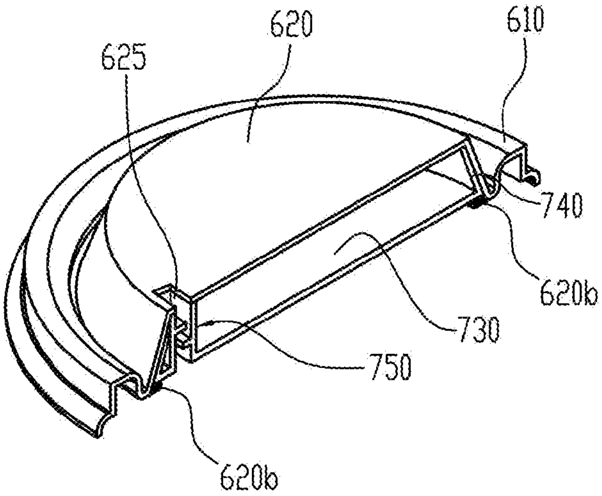
FIG. 21 is a perspective cross-sectional view taken along line A-A' of FIG. 20.
Figure 22:
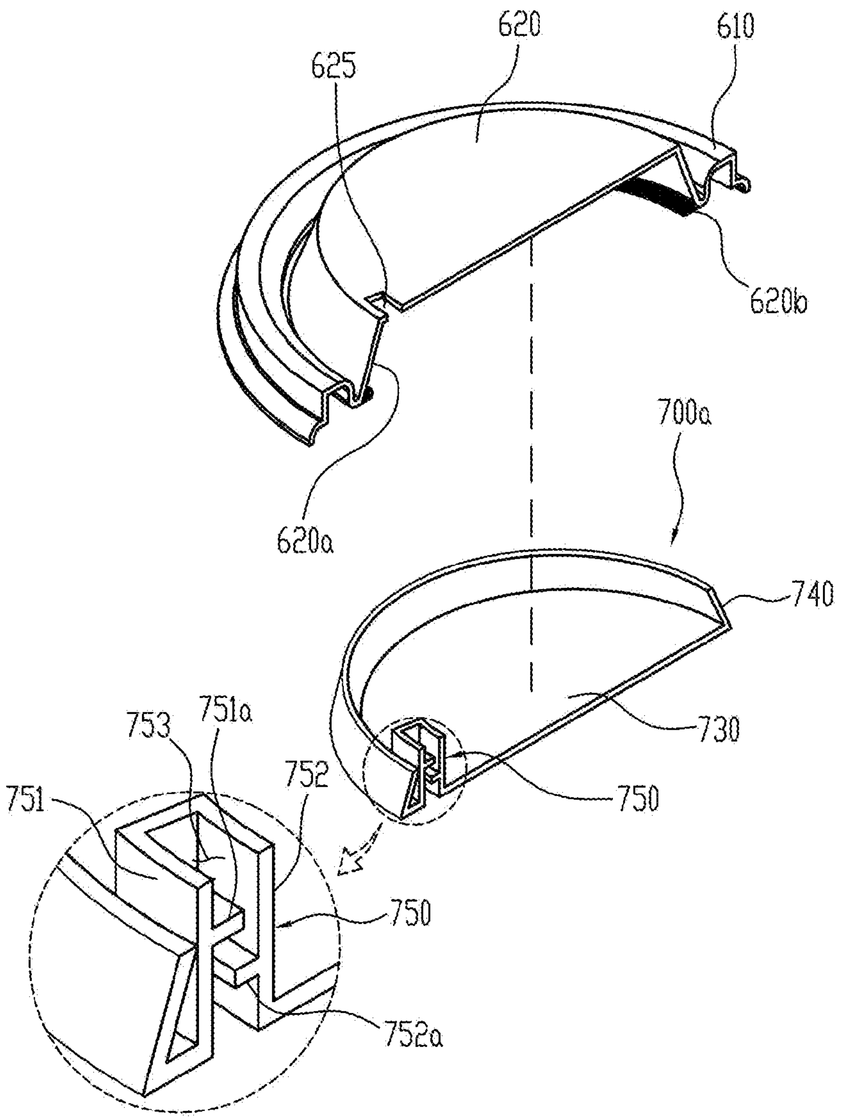
FIG. 22 is an exploded perspective view of FIG. 21.
Figure 23:
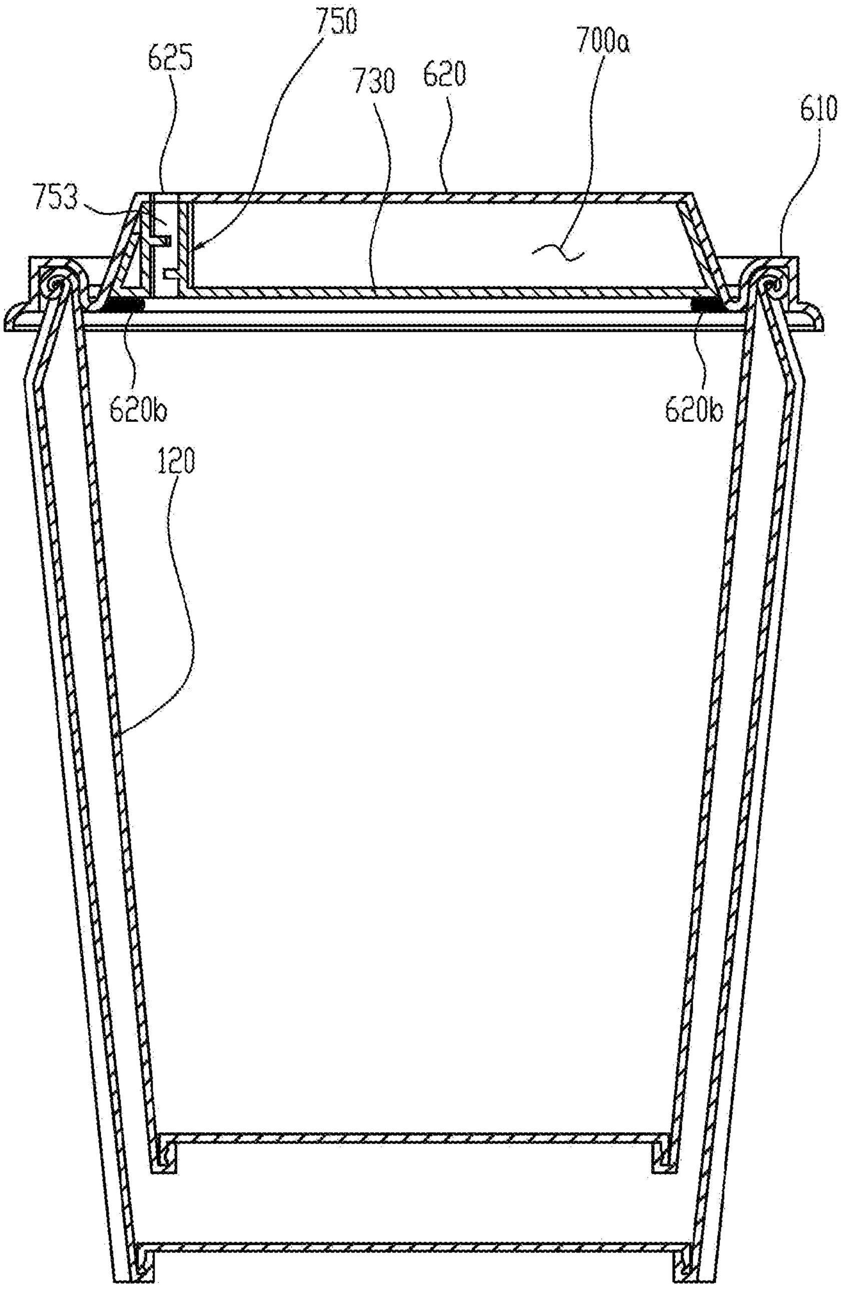
FIG. 23 is a cross-sectional view of a paper cup having a dual structure according to yet another embodiment of the present invention.
Figure 24:
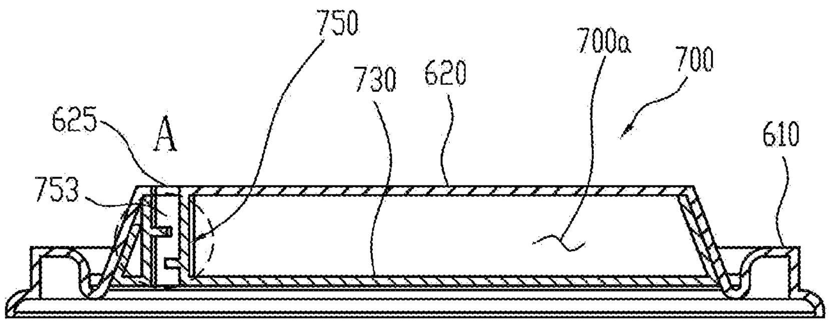
FIG. 24 is a cross-sectional view of the lid part according to yet another embodiment of the present invention.
Figure 25:
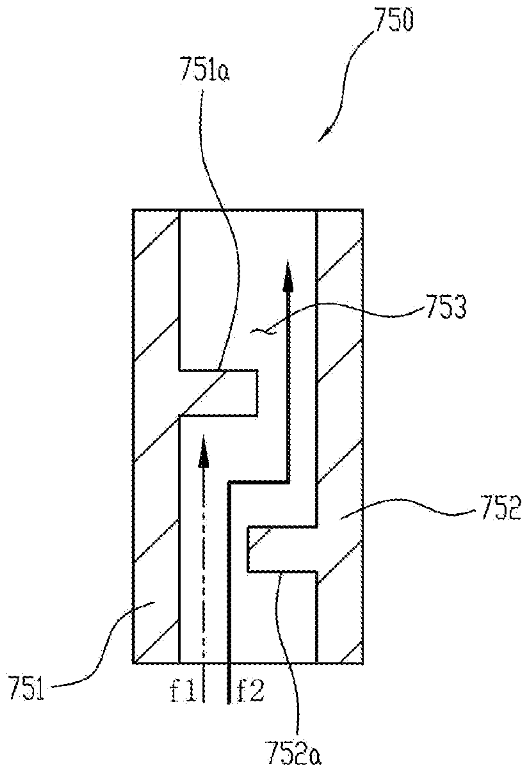
FIGS. 25 and 26 are schematic views of a drinking path according to yet another embodiment of the present invention.

FIG. 20 is a perspective view of a lid part according to yet another embodiment of the present invention, FIG. 21 is a perspective cross-sectional view taken along line A-A' of FIG. 20, FIG. 22 is an exploded perspective view of FIG. 21, FIG. 23 is a cross-sectional view of a paper cup having a dual structure according to yet another embodiment of the present invention, FIG. 24 is a cross-sectional view of the lid part according to yet another embodiment of the present invention, and FIG. 25 is a schematic view of a drinking path according to yet another embodiment of the present invention.

As shown in FIGS. 20 and 21, the paper cup having the dual structure according to yet another embodiment of the present invention includes an inner paper part having a plurality of diameter adjusting portions formed at predetermined angular intervals on one surface thereof, a drink receiving part 120 formed to extend from one end of the inner paper part 110 so as to contain a drink within the inner paper part 110, a drinking part 130' formed at a boundary between the inner paper part 110 and the drink receiving part 120, a first protrusion 610 fitted on the drinking part 130', a second protrusion 620 connected to the first protrusion 610 through a recess to be formed consecutively with the first protrusion 610 and configured to have a through hole 625 formed through the upper surface thereof and an inner receiving part formed therein, and a lower lid part *700a* including an outer circumferential wall 740 coupled to an inner surface 620*a* of the inner circumference of the second protrusion 620, an adiabatic member 730 configured to extend from the outer circumferential wall 740 and separated from the inner upper surface of the second protrusion 620 so as to form an adiabatic space, and a drinking path part 750 configured to enable the drink receiving part 120 and the through hole 625 to communicate with each other.

First, because yet another embodiment of the present invention relates to another example of the lid part of the paper cup having the dual structure, the inner paper part, the drink receiving part, the first protrusion and the second protrusion of the paper cup having the dual structure have been described above in connection with the paper cup having the dual structure according to one embodiment, and a detailed description thereof will thus be omitted.

The lid part of the paper cup having the dual structure according to yet another embodiment of the present invention includes the outer circumferential wall 740 coupled to the inner surface 620*a* of the inner circumference of the inner receiving part formed inside the second protrusion protruding upwards, the adiabatic member 730 separated from the upper portion of the second protrusion to form the adiabatic space therein, and the drinking path part 750 configured to constitute a drinking path 753 and to enable the drink receiving part and the through hole of the paper cup to communicate with each other so that a user may drink a drink flowing out therefrom.

Here, the lid part according to yet another embodiment of the present invention is completely fitted into the second protrusion to form the adiabatic space therein and simultaneously to form the drinking path part 750 configured to constitute the drinking path 753, which enables the through hole and the drink receiving part to communicate with each other. The drinking path part 750 is formed as a sealed space separately from the adiabatic space so that the drink in the drink receiving part may flow to the through hole 625 of the second protrusion 620 only via the drinking path part 750.

In general, in order to prevent the drink in the drink receiving part 120 from pouring towards the through hole 625 or to prevent the drink from overflowing due to the movement of the user holding the paper cup, a separate lid may be used. However, there are limitations on the extent to which such a separate means is capable of eliminating the user's difficulty in drinking the drink and fundamentally preventing the drink from suddenly leaking due to an increase in the inner pressure when the lid part is closed and from overflowing through the through hole 625 due to the flow of the drink caused by the user's movement. The lid part 600 of the paper cup having the dual structure according to yet another embodiment of the present invention serves to prevent the drink in the drink receiving part 120 from suddenly leaking to the outside and simultaneously to induce the natural inner flow of the drink when drinking.

Referring to FIG. 22, the lower lid part 700*a* is coupled to the inner receiving part of the second protrusion 620. The lower lid part 700*a* is configured such that the outer circumferential wall 740 coupled to the inner surface 620*a* of the inner receiving part of the second protrusion 620 and the adiabatic member 730 separated from the upper end of the second protrusion 620 to form the adiabatic space therein are coupled to each other. The drinking path part 750 is formed to be sealed separately from the adiabatic space so as to enable the through hole 625 and the drink receiving part 120 to communicate with each other so that the user is capable of drink the drink in the paper cup.

Although FIG. 22 illustrates that the lower lid part 700*a* is fixedly fitted into the inner receiving part of the second protrusion by a coupling projection 620*b*, the lower lid part 700*a* may be manufactured so as to be formed integrally with the inner receiving part of the second protrusion depending on the manufacturing method thereof. The coupling projection 620*b* may be formed along the inner circumference of the inner receiving part of the second protrusion 620 so as to stably couple and fix the lower lid part 700*a* to the inner receiving part of the second protrusion 620, and may be formed of rubber or a plastic material which may exhibit a buffering function, such as an elastic member. Thereby, if the lid part of the paper cup is a separable type, the lower lid part 700*a* may be replaced or exchanged.

The drinking path part 750, which constitutes the drinking path 753, may be configured such that one side wall 751 and a remaining side wall 752 are disposed opposite each other to form a space for connecting the through hole and the drink receiving part to each other, and the one side wall 751 and the remaining side wall 752 extend and are integrally connected to surround the space so as to seal the space. The drinking path 753 serves as the space for connecting the through hole 625 and the drink receiving part 120 to each other, and the drink may suddenly overflow or leak to the outside of the space. In order to prevent the drink from overflowing and leaking, guide walls 751*a* and 752*a* are formed in the space inside the drinking path 753. The guide walls 751*a* and 752*a* protrude from the corresponding side walls 751 and 752 and extend in opposite directions so as not to contact the opposing side walls, thereby ensuring a space in which the drink may flow.

As shown in FIG. 25, by forming the first guide wall 751*a* and the second guide wall 752*a* in a direction perpendicular to the direction in which the through hole 625 and the drink receiving part of the drinking path 753 are connected, the guide walls 751*a* and 752*a* may block the sudden flow of the drink from the drink receiving part 120 (with reference to direction f1 in FIG. 25). Because if the drink in the drink receiving part 120 suddenly leaks to the outside due to external force or pressure, the drink splashes up while moving rectilinearly in consideration of the general speed thereof, and the guide walls 751*a* and 752*a* may thus block this sudden flow of the drink. In addition, if the paper cup is naturally tilted upwards for drinking, the drink naturally flows from the drink receiving part 120 to the through hole, as shown by arrow f2, via a zigzag-shaped path open towards the ends of the first guide wall 751*a* and the second guide wall 752*a*, and thus, this structure does not disturb user's drinking and naturally prevents an excessive amount of the drink from flowing or prevents the drink from overflowing when the user drinks the drink, thereby being advantageous in that the user may drink the drink at an appropriate flow speed and flow rate.

The first guide wall 751*a* and the second guide wall 752*a* may be formed on the one side wall 751*a* and the remaining side wall 752*a* in a zigzag pattern or alternately so as to be separated from the longitudinal space in which the drinking path 753 is formed, as shown in FIG. 25, thereby being capable of effectively blocking the drink that suddenly flows along the drinking path 753. The respective ends of the first guide wall 751*a* and the second guide wall 752*a* in the drinking path 753 may coincide with each other in the direction in which the drinking path 753 is formed.

Figure 26:
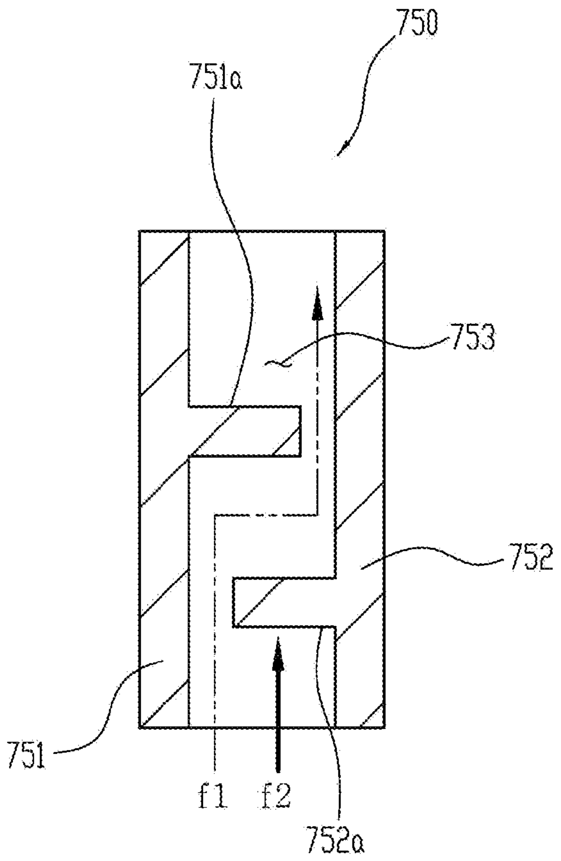

Otherwise, as shown in FIG. 26, the first guide wall 751*a* and the second guide wall 752*a* may be formed so as to overlap each other inside the space of the drinking path 753 in the length direction of the drinking path 753, i.e., so that the respective ends of the first guide wall 751*a* and the second guide wall 752*a* are disposed in a zigzag pattern. Thereby, the drink may flow towards the through hole 625 due only to the natural flow of the drink, and when sudden flow of the drink occurs or when the paper cup falls and thus the flow rate of the drink is suddenly increased, the flow speed of the drink is drastically decreased and thus discharge of the drink to the through hole 625 may be effectively blocked or slowed.

While the present invention has been described in detail in relation to the embodiments thereof, the paper cup having the dual structure and the method for manufacturing the same according to the present invention are not limited by the aspects described herein, and it should be apparent to those skilled in the art that various substitutions, changes and modifications which are not exemplified herein but are still within the spirit and scope of the present disclosure may be made.

Those skilled in the art will appreciate that various modifications, additions and substitutions are possible, without departing from the scope and spirit of the invention as disclosed in the accompanying claims.

| | |
|---|---|
| 110: | inner paper part |
| 115: | diameter adjusting portions |
| 116: | bent portion |
| 120: | drink receiving part |
| 126: | bent portion |
| 130: | boundary |
| 130: | drinking part |
| 200: | first bottom part |
| 206: | bent portion |
| 300: | second bottom part |
| 306: | bent portion |
| 400: | adiabatic space |
| 500: | grip part |
| 600: | lid part |
| 610: | first protrusion |
| 615: | recess |
| 620: | second protrusion |
| 620a: | inner surface |
| 620b: | coupling projection |
| 625: | through hole |
| 630: | adiabatic part |
| 700: | lid adiabatic space |
| S: | separation space |
| 700a: | lower lid part |
| 730: | adiabatic member |
| 740: | outer circumferential wall |
| 750: | drinking path part |
| 751: | one side wall |
| 751a: | first guide wall |
| 752: | remaining side wall |
| 752a: | second guide wall |
| 753: | drinking path |

The invention claimed is:

1. A paper cup having a dual structure, comprising:

an inner paper part having a plurality of diameter adjusting portions formed at predetermined angular intervals on one surface thereof;

a grip part configured to cover an outer surface of the inner paper part and is coupled to the plurality of diameter adjusting portions;

a drink receiving part formed to extend from one end of the inner paper part and to be bent towards an inner portion of the inner paper part;

a drinking part formed at a boundary between the inner paper part and the drink receiving part and rolled in a radially outward direction of the drink receiving part;

a first bottom part formed at one end of the drink receiving part and adhesively coupled to the end of the drink receiving part so as to alternate with the end of the drink receiving part; and a second bottom part formed at one end of the inner paper part and adhesively coupled to the end of the inner paper part so as to alternate with the end of the inner paper part, wherein a space between the inner paper part and the drink receiving part is sealed by the first bottom part and the second bottom part so as to form an adiabatic space, wherein the plurality of diameter adjusting portions are formed to protrude to the outside of the inner paper part, the grip part is coupled to protruding regions of the plurality of diameter adjusting portions so as to cover the outer surface of the inner paper part, the plurality of diameter adjusting portions forms an adiabatic space between the inner paper part and the grip part.

2. The paper cup according to claim 1, further comprising a lid part comprising a first protrusion fitted on the drinking part, a second protrusion connected to the first protrusion through a recess so as to be formed consecutively with the first protrusion and configured to have a through hole formed through an upper surface thereof, and an adiabatic part having a regular thickness and formed on a lower surface of the lid part so as to form a lid adiabatic space.

3. A method for manufacturing a paper cup having a dual structure, the method comprising:

rolling one paper member configured such that an inner paper part and a drink receiving part are connected, into a truncated conical shape;

folding the drink receiving part towards an inner portion of the inner paper part along a boundary at which the inner paper part and the drink receiving part come into linear contact with each other;

adjusting a diameter of the inner paper part by forming a plurality of diameter adjusting portions at predetermined angular intervals on one surface of the inner paper part so as to protrude in a radially outward direction of a lower end of the inner paper part;

forming a drinking part by rolling a region between the inner paper part and the drink receiving part in a radially outward direction of the drink receiving part;

forming a first bottom part at one end of the drink receiving part to be adhesively coupled to the end of the drink receiving part so as to alternate with the end of the drink receiving part; and forming a second bottom part at one end of the inner paper part to be adhesively coupled to the end of the inner paper part so as to alternate with the end of the inner paper part.

4. The method according to claim 3, further comprising:

adhesively coupling a grip part to the inner paper part so as to cover an outer surface of the inner paper part.

5. The method according to claim 4, further comprising:

coupling a lid part, comprising a first protrusion fitted on the drinking part, a second protrusion connected to the first protrusion through a recess so as to be formed consecutively with the first protrusion and configured to have a through hole formed through an upper surface thereof, and an adiabatic part having a regular thickness and formed on a lower surface of the lid part so as to form a lid adiabatic space, to the drinking part.

6. The method according to claim 4, wherein, in the adhesively coupling the grip part to the inner paper part, the grip part is coupled to protruding regions of the diameter adjusting portions, formed to protrude in a radially outward direction of the inner paper part, so as to cover the outer surface of the inner paper part.

7. The method according to claim 3, wherein, in the forming the first bottom part and in the forming the second bottom part, a space between the inner paper part and the drink receiving part is sealed by the first bottom part and the second bottom part so as to form an adiabatic space.

8. The method according to claim 7, wherein the adiabatic space is formed to have a uniform thickness.

9. A method for manufacturing a paper cup having a dual structure, the method comprising:

adjusting a diameter of an outer cup configured to constitute an inner paper part by forming a plurality of diameter adjusting portions at predetermined angular intervals on one surface of the outer cup so as to protrude in a radially outward direction of a lower end of the outer cup;

inserting an inner cup into the outer cup;

forming a drinking part by rolling outer circumferences of the outer cup and the inner cup in the radially outward direction; and adhesively coupling a grip part to the protruding regions of the plurality of diameter adjusting portions to cover the outer surface of the outer cup, wherein the plurality of diameter adjusting portions forms an adiabatic space between the inner paper part and the grip part, and the width of the adiabatic space is adjusted by adjusting the length of the protrusion of the plurality of diameter adjusting portions.

10. The method according to claim 9, further comprising:

coupling a lid part, comprising a first protrusion fitted on the drinking part, a second protrusion connected to the first protrusion through a recess so as to be formed consecutively with the first protrusion and configured to have a through hole formed through an upper surface thereof, and an adiabatic part having a regular thickness and formed on a lower surface of the lid part so as to form a lid adiabatic space, to the drinking part.

11. A paper cup having a dual structure, comprising:

an inner paper part having a plurality of diameter adjusting portions formed at predetermined angular intervals on one surface thereof;

a grip part configured to cover an outer surface of the inner paper part and is coupled to the plurality of diameter adjusting portions;

a drink receiving part formed to extend from one end of the inner paper part and to be bent towards an inner portion of the inner paper part so as to contain a drink within the inner paper part;

a drinking part formed at a boundary between the inner paper part and the drink receiving part and rolled in a radially outward direction of the drink receiving part;

a first protrusion fitted on the drinking part;

a second protrusion connected to the first protrusion through a recess to be formed consecutively with the first protrusion and configured to have a through hole formed through an upper surface thereof and an inner receiving part formed therein;

a first bottom part formed at one end of the drink receiving part and adhesively coupled to the end of the drink receiving part so as to alternate with the end of the drink receiving part;

a second bottom part formed at one end of the inner paper part and adhesively coupled to the end of the inner paper part so as to alternate with the end of the inner paper part, wherein a space between the inner paper part and the drink receiving part is sealed by the first bottom part and the second bottom part so as to form an adiabatic space; and a lower lid part comprising an outer circumferential wall coupled to an inner surface of an inner circumference of the second protrusion, an adiabatic member configured to extend from the outer circumferential wall and separated from an inner upper surface of the second protrusion so as to form an adiabatic space, and a drinking path part configured to enable the drink receiving part and the through hole to communicate with each other;

wherein the plurality of diameter adjusting portions are formed to protrude to the outside of the inner paper part, the grip part is coupled to protruding regions of the plurality of diameter adjusting portions so as to cover the outer surface of the inner paper part, the diameter adjusting portions forms an adiabatic space between the inner paper part and the grip part.

12. The paper cup according to claim 11, wherein the drinking path part is formed to be sealed in the adiabatic space, and comprises at least one guide member formed in a direction perpendicular to a space of a drinking path configured to connect the drink receiving part and the through hole, and coupled to the drinking path so as to enable a drink in the drink receiving part to flow therein.

13. The paper cup according to claim 12, wherein the drinking path part is configured such that one side wall and a remaining side wall disposed opposite the one side wall are coupled to be mutually sealed to form the space of the drinking path, and the at least one guide member comprises a first guide member configured to extend the one side wall in a direction towards the remaining side wall so as to be separated from the remaining side wall and a second guide member configured to extend the remaining side wall in a direction towards the one side wall so as to be separated from the one side wall, the first guide member and the second guide member being formed so as to alternate with each other in a length direction of the space of the drinking path.

14. The paper cup according to claim 13, wherein one end of the first guide member in the direction towards the remaining side wall and one end of the second guide member in the direction towards the one side wall are located so as to overlap each other in the length direction of the space of the drinking path.

15. The paper cup according to claim 14, wherein the one end of the first guide member in the direction towards the remaining side wall and the one end of the second guide member in the direction towards the one side wall are located at positions coinciding with each other in the length direction of the space of the drinking path.

* * * * *